(12) United States Patent
Sasaki et al.

(10) Patent No.: US 7,978,432 B2
(45) Date of Patent: Jul. 12, 2011

(54) THIN-FILM MAGNETIC HEAD STRUCTURE

(75) Inventors: Yoshitaka Sasaki, Santa Clara, CA (US); Hironori Araki, Milpitas, CA (US); Hiroyuki Ito, Sunnyvale, CA (US)

(73) Assignee: Headway Technologies, Inc., Milpitas, CA (US)

(*) Notice: Subject to any disclaimer, the term of this patent is extended or adjusted under 35 U.S.C. 154(b) by 241 days.

(21) Appl. No.: 12/232,664

(22) Filed: Sep. 22, 2008

(65) Prior Publication Data

US 2009/0086370 A1    Apr. 2, 2009

Related U.S. Application Data

(63) Continuation of application No. 10/985,891, filed on Nov. 12, 2004, now Pat. No. 7,558,020.

(51) Int. Cl.
*G11B 5/147* (2006.01)

(52) U.S. Cl. .................................. 360/125.42

(58) Field of Classification Search ............ 360/125.41, 360/125.42, 125.46, 123.03, 123.01, 123.04, 360/125.14, 125.12, 125.1, 125.03, 123.05, 360/123.6, 123.61, 123.26; 29/603.07, 603.13, 29/603.23
See application file for complete search history.

(56) References Cited

U.S. PATENT DOCUMENTS

| 4,656,546 | A | | 4/1987 | Mallory | |
|---|---|---|---|---|---|
| 4,672,493 | A | | 6/1987 | Schewe | |
| 5,600,519 | A | | 2/1997 | Heim et al. | |
| 5,801,910 | A | * | 9/1998 | Mallary | 360/125.65 |
| 5,802,700 | A | * | 9/1998 | Chen et al. | 29/603.14 |
| 6,104,576 | A | | 8/2000 | Santini | |
| 6,259,585 | B1 | | 7/2001 | Sasaki et al. | |
| 6,369,984 | B1 | * | 4/2002 | Sato | 360/125.43 |
| 6,504,675 | B1 | | 1/2003 | Shukh et al. | |
| 6,952,867 | B2 | * | 10/2005 | Sato | 29/603.15 |
| 7,141,357 | B2 | * | 11/2006 | Sasaki et al. | 430/320 |
| 7,333,296 | B2 | | 2/2008 | Sasaki et al. | |
| 7,549,215 | B2 | * | 6/2009 | Hsiao et al. | 29/603.14 |
| 2002/0093763 | A1 | | 7/2002 | Sato et al. | |
| 2005/0190491 | A1 | | 9/2005 | Le et al. | |
| 2010/0126001 | A1 | * | 5/2010 | Bonhote et al. | 29/603.07 |

FOREIGN PATENT DOCUMENTS

| JP | A-01-128212 | 5/1989 |
|---|---|---|
| JP | A-02-071413 | 3/1990 |
| JP | A-10-340425 | 12/1998 |
| JP | A-2002-092821 | 3/2002 |
| JP | A-2002-197615 | 7/2002 |
| JP | A-2003-030804 | 1/2003 |
| JP | A-2003-203311 | 7/2003 |
| JP | A-2003-242607 | 8/2003 |
| JP | A-2004-094997 | 3/2004 |
| JP | A-2004-295987 | 10/2004 |
| JP | A-2005-018918 | 1/2005 |

* cited by examiner

*Primary Examiner* — Julie A Watko
(74) *Attorney, Agent, or Firm* — Oliff & Berridge, PLC

(57) ABSTRACT

A thin-film magnetic head structure has a configuration adapted to manufacture a thin-film magnetic head configured such that a main magnetic pole layer including a magnetic pole tip on a side of a medium-opposing surface opposing a recording medium, a write shield layer opposing the magnetic pole tip so as to form a recording gap layer on the medium-opposing surface side, and a thin-film coil wound about the write shield layer or main magnetic pole layer are laminated. The magnetic pole tip of the main magnetic pole layer includes an even width portion having a substantially even width along an extending direction.

9 Claims, 35 Drawing Sheets

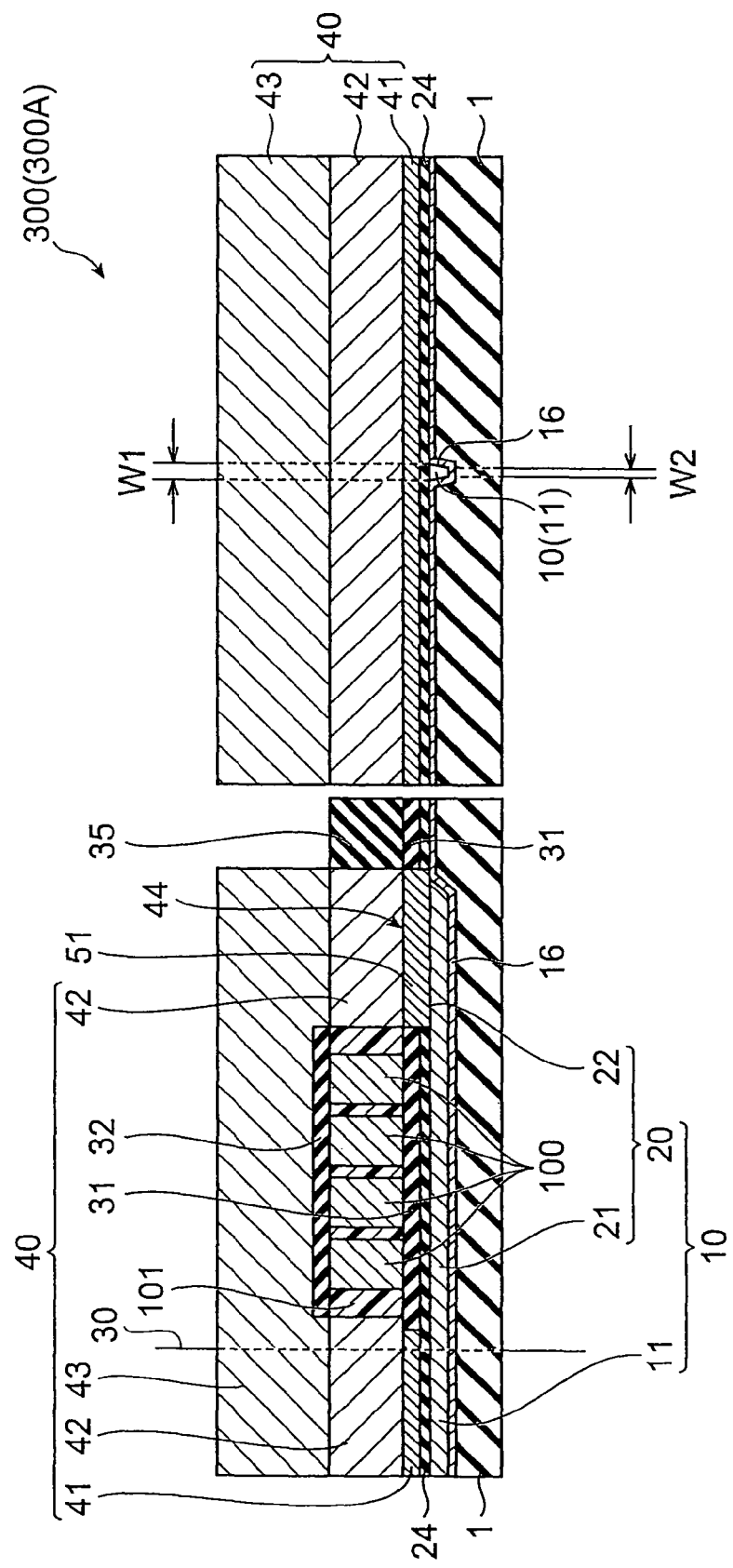

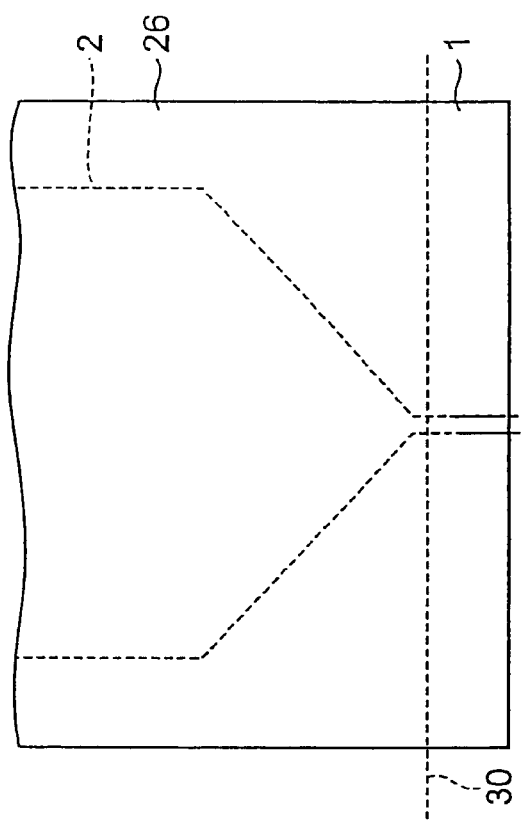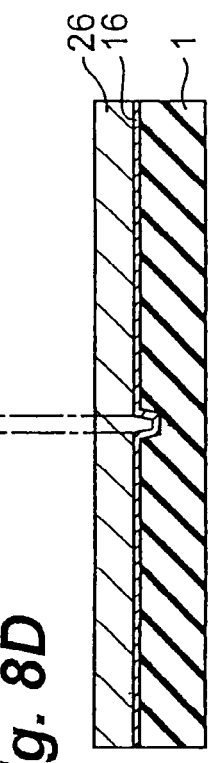
Fig. 8A
Fig. 8B
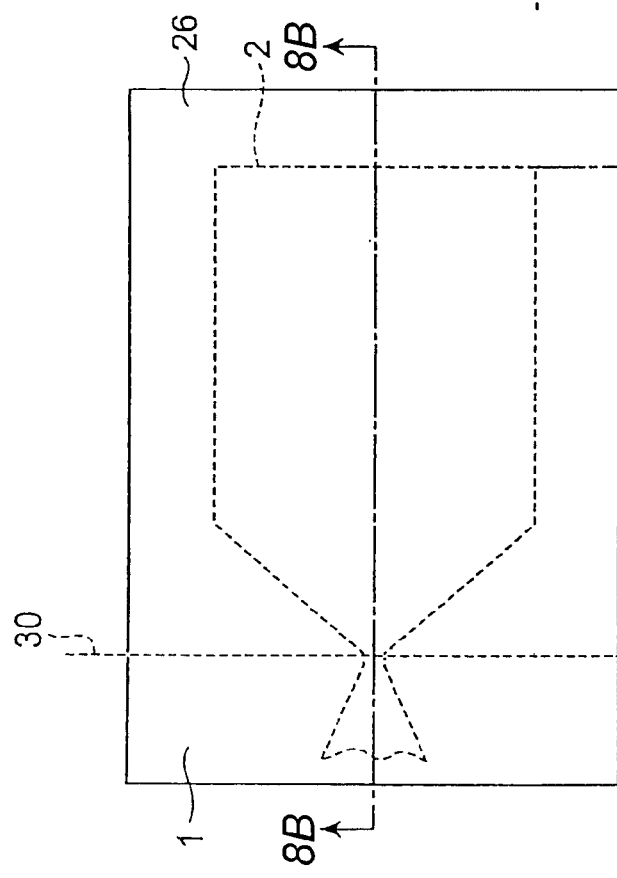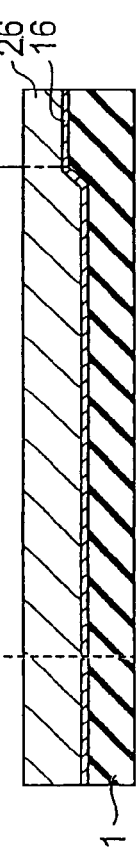
Fig. 8C
Fig. 8D

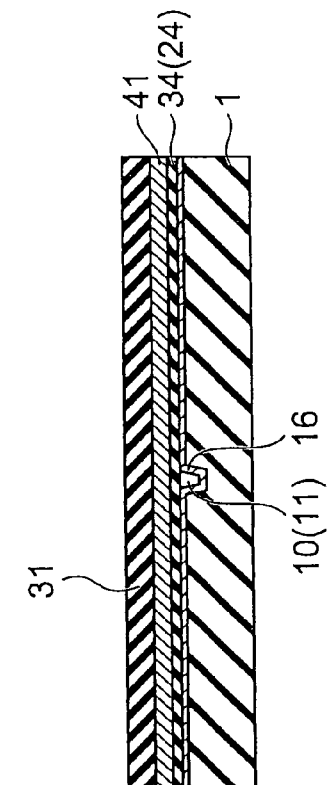
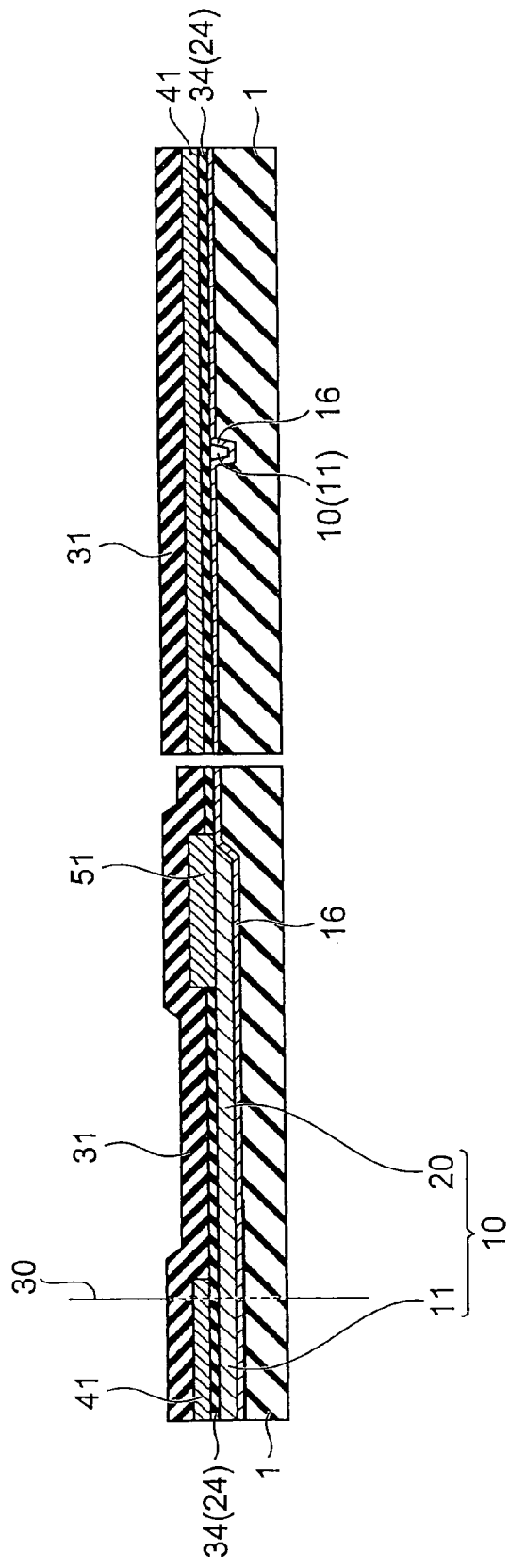

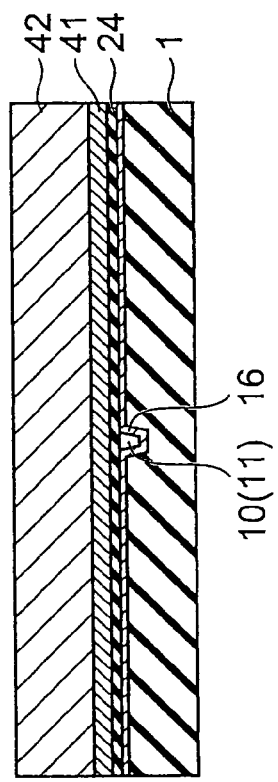
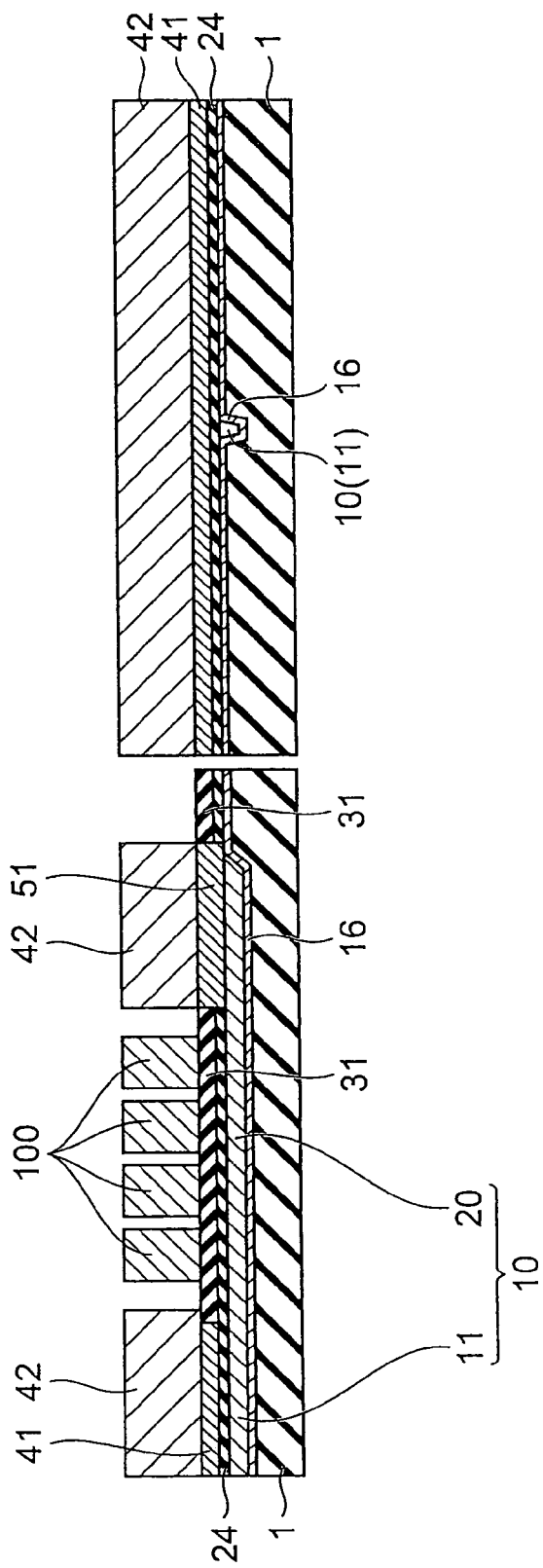

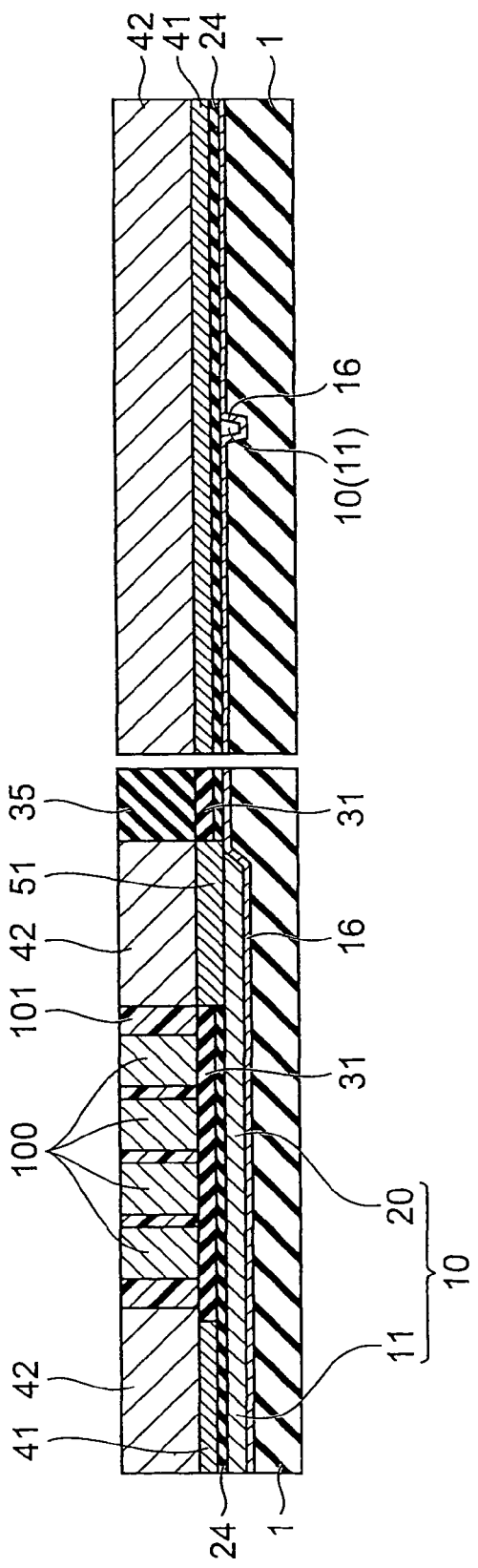

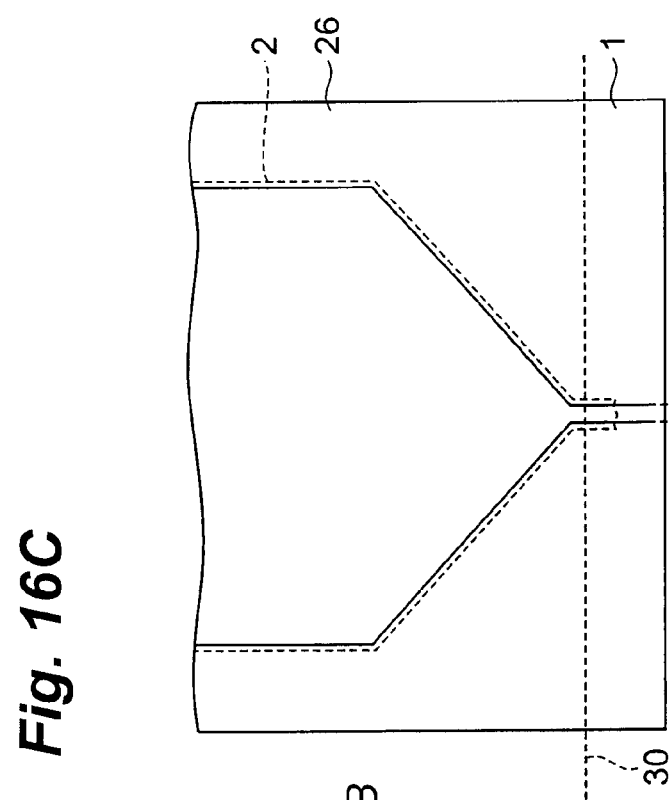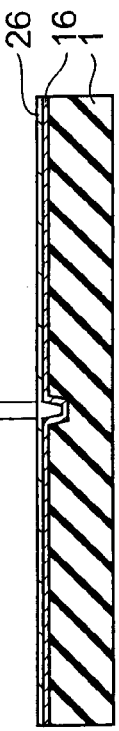
Fig. 16C
Fig. 16D
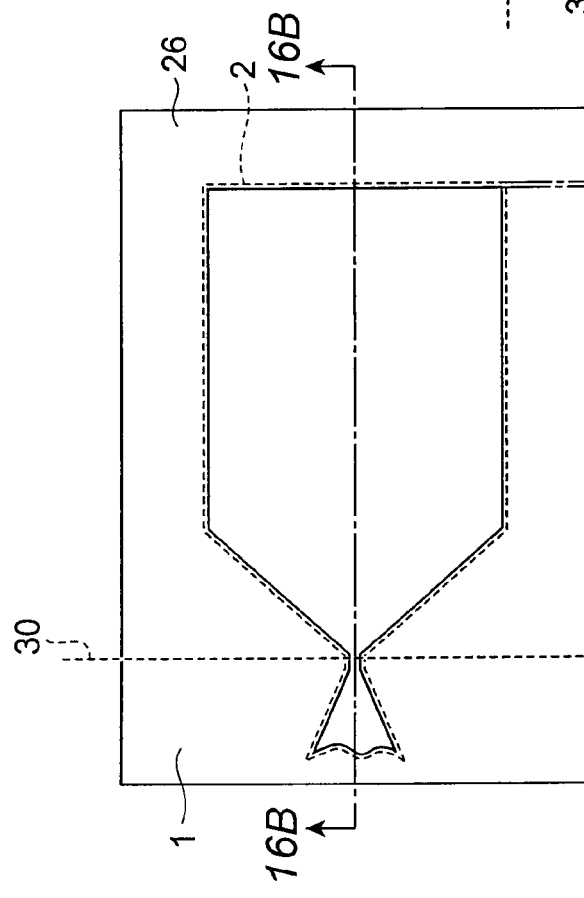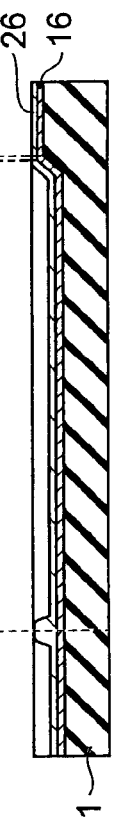
Fig. 16A
Fig. 16B

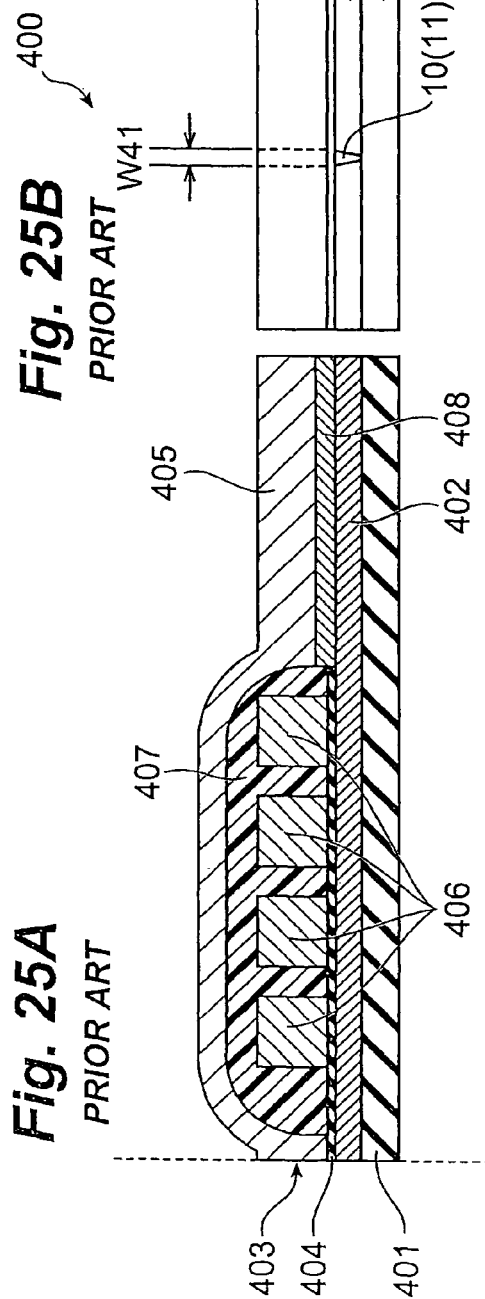
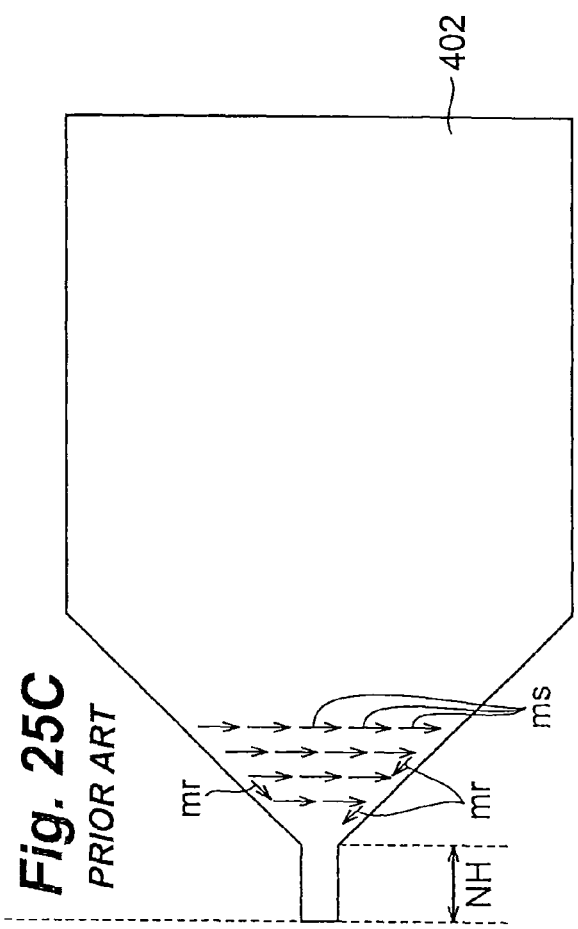
Fig. 25A PRIOR ART
Fig. 25B PRIOR ART
Fig. 25C PRIOR ART

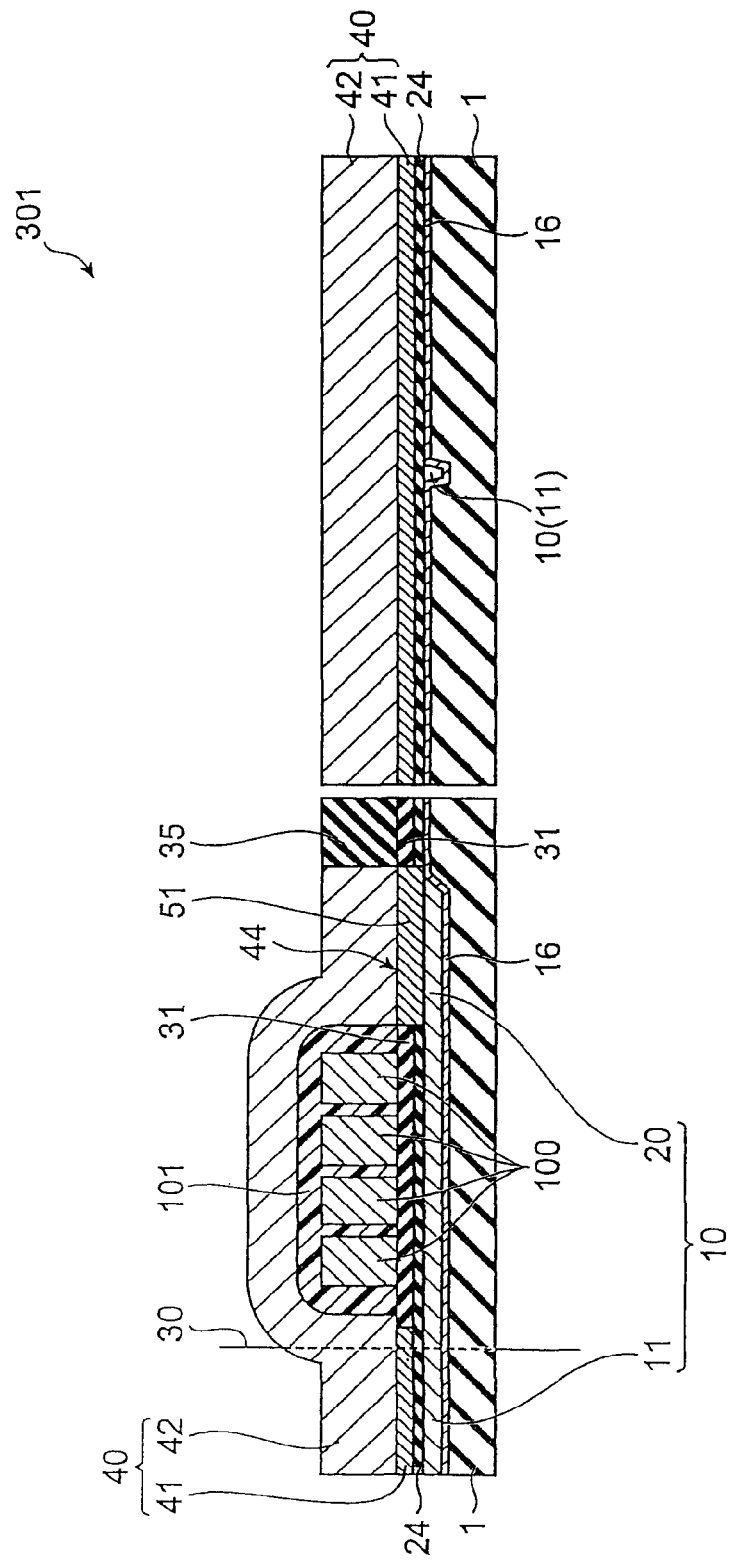

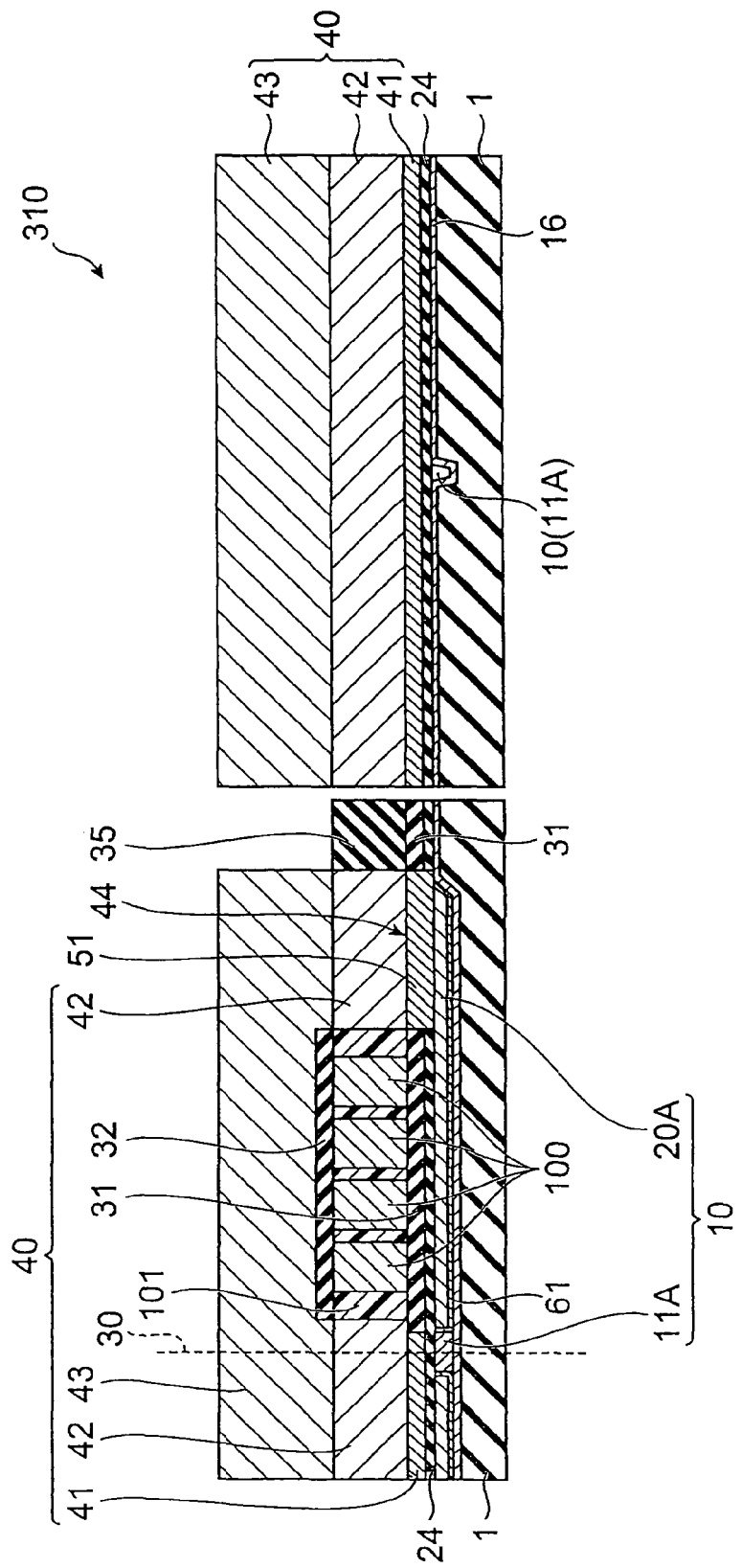

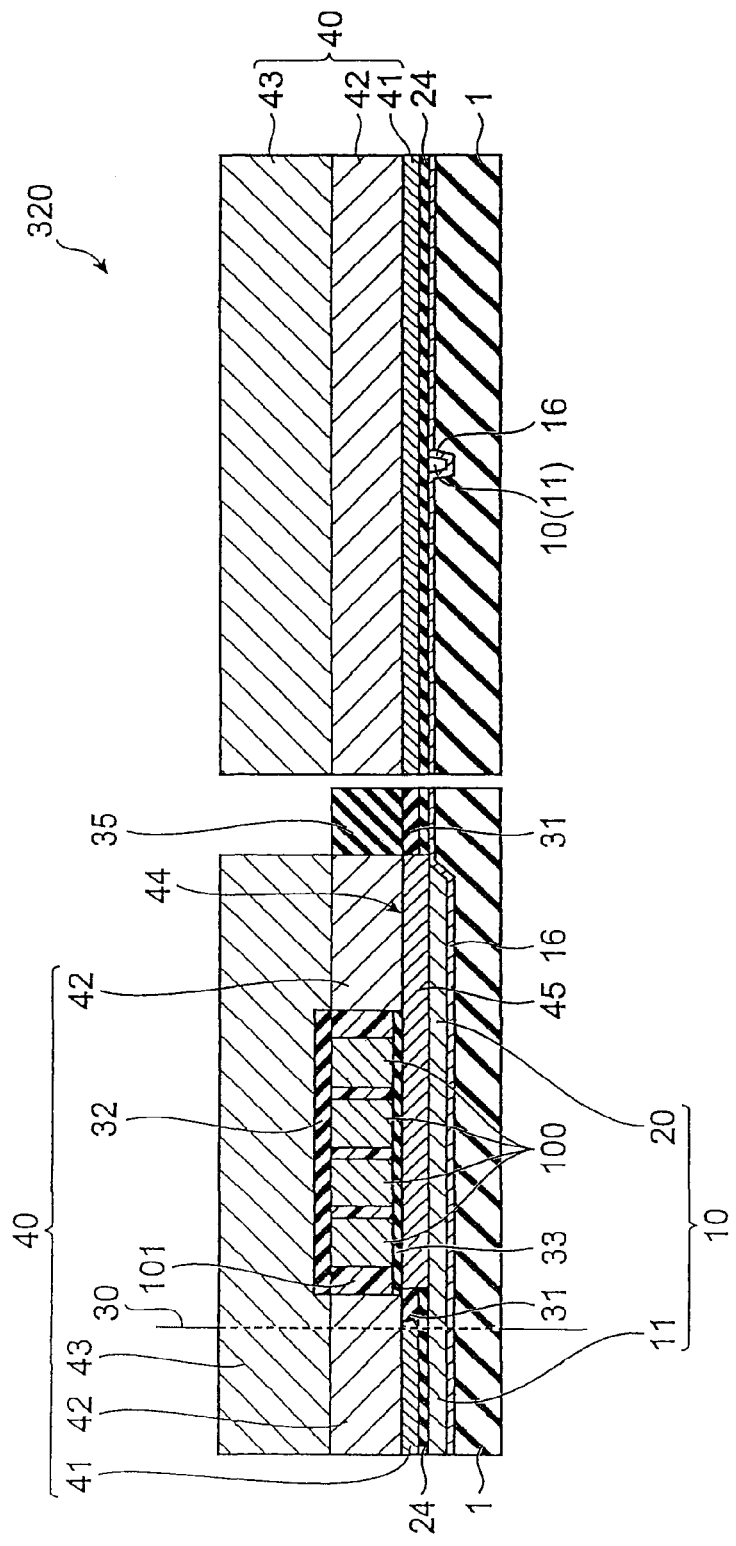

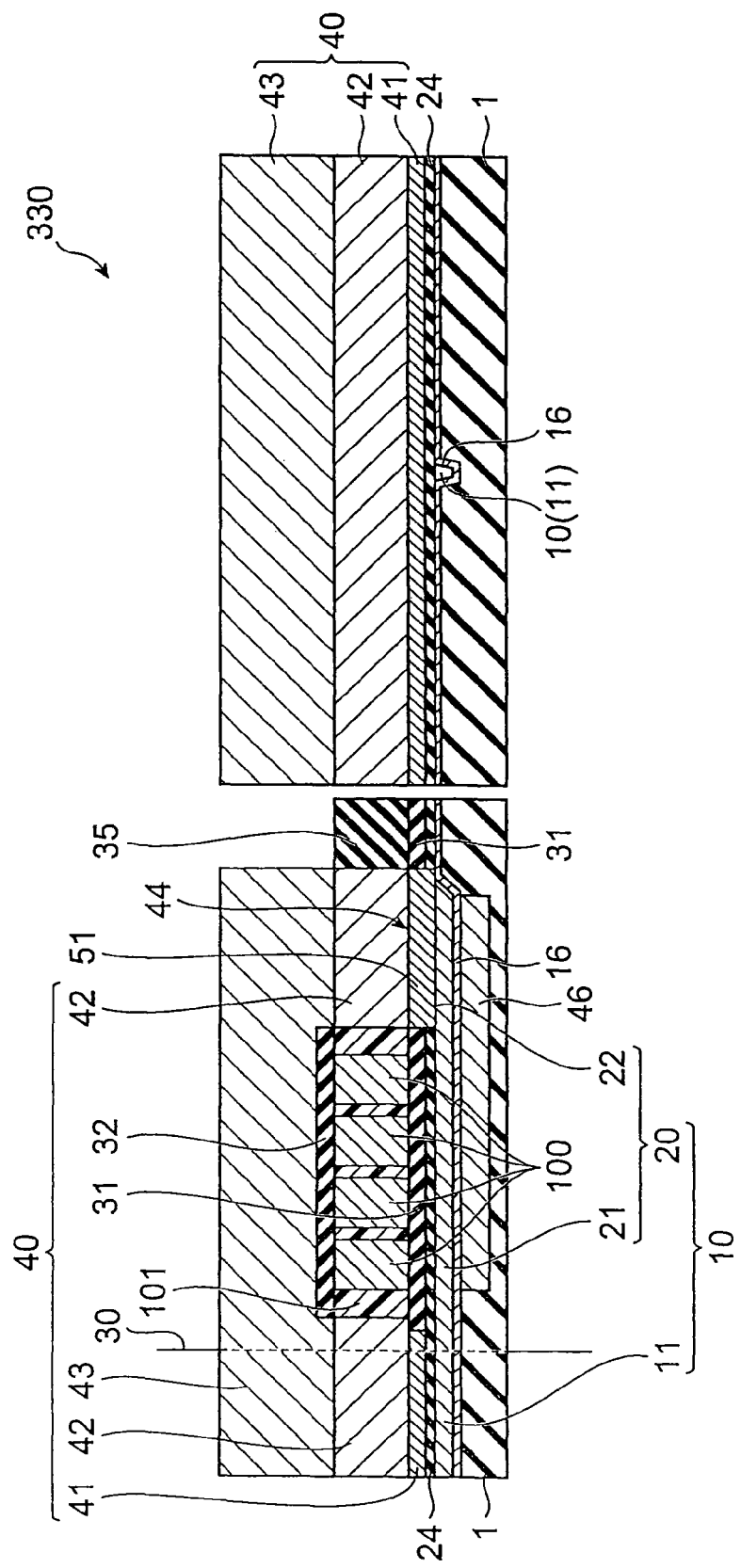

THIN-FILM MAGNETIC HEAD STRUCTURE

This application is a continuation of U.S. patent application Ser. No. 10/985,891, filed Nov. 12, 2004, the entire contents of which are hereby incorporated by reference.

BACKGROUND OF THE INVENTION

1. Field of the Invention

The present invention relates to a thin-film magnetic head structure for manufacturing a thin-film magnetic head which performs magnetic recording operations by perpendicular recording, a method of manufacturing the same, and a thin-film magnetic head.

2. Related Background Art

In recent years, the areal density in hard disk drives has been increasing remarkably. Recently, the areal density in hard disk drives has reached 160 to 200 GB/platter in particular, and is about to increase further. Accordingly, thin-film magnetic heads have been required to improve their performances.

In terms of recording schemes, thin-film magnetic heads can roughly be divided into those for longitudinal recording in which information is recorded in a (longitudinal) direction of a recording surface of a hard disk (recording medium) and those for perpendicular recording in which data is recorded while the direction of recording magnetization formed in the hard disk is perpendicular to the recording surface. As compared with the thin-film magnetic heads for longitudinal recording, the thin-film magnetic heads for perpendicular recording have been considered more hopeful, since they can realize a much higher recording density while their recorded hard disks are less susceptible to thermal fluctuations.

Conventional thin-film magnetic heads for perpendicular recording are disclosed, for example, in U.S. Pat. No. 6,504,675, U.S. Pat. No. 4,656,546, U.S. Pat. No. 4,672,493, and Japanese Patent Application Laid-Open No. 2004-94997.

Meanwhile, when thin-film magnetic heads for perpendicular recording record data onto areas in inner and outer peripheries of a hard disk, a magnetic pole tip disposed on the side of a medium-opposing surface (also referred to as air bearing surface, ABS) opposing the recording medium (hard disk) yields a certain skew angle with respect to a data recording track. In perpendicular magnetic recording heads (hereinafter also referred to as "PMR") having a high writing capability, the skew angle has caused a problem of so-called side fringe in which unnecessary data are recorded between adjacent tracks. The side fringe adversely affects the detection of servo signals and the S/N ratio of reproduced waveforms. Therefore, in conventional PMRs, the magnetic pole tip on the ABS side in the main magnetic pole layer has a bevel form gradually narrowing in width toward one direction (see, for example, Japanese Patent Application Laid-Open Nos. 2003-242607 and 2003-203311 in this regard).

SUMMARY OF THE INVENTION

In PMRs in which the magnetic pole tip on the ABS side in the main magnetic pole layer has a bevel form, the width of the magnetic pole (hereinafter referred to as tip width) is not sufficiently uniform and thus is uneven along the length of the main magnetic pole layer. Therefore, when the above-mentioned magnetic pole tip of the main magnetic pole layer formed on the wafer is cut at a predetermined position so as to define the ABS, the tip width of the ABS may vary depending on the cut position. Hence, there have been cases where the conventional PMRs yield large deviations in the track width (recording track width) in the ABS among products.

In order to overcome the problem mentioned above, it is an object of the present invention to provide a thin-film magnetic head structure which performs track width control with a high accuracy, a method of manufacturing the same, and a thin-film magnetic head.

For solving the above-mentioned problem, in one aspect, the present invention provides a thin-film magnetic head structure adapted to manufacture a thin-film magnetic head configured such that a main magnetic pole layer including a magnetic pole tip on a side of a medium-opposing surface opposing a recording medium, a write shield layer opposing the magnetic pole tip so as to form a recording gap layer on the medium-opposing surface side, and a thin-film coil wound about the write shield layer or main magnetic pole layer are laminated; wherein the magnetic pole tip of the main magnetic pole layer includes an even width portion having a substantially even width along an extending direction intersecting the medium-opposing surface.

In this thin-film magnetic head structure, a main magnetic pole layer comprising a magnetic pole tip including an even width portion is formed. Therefore, if the main magnetic pole layer is cut at the even width portion of the magnetic pole tip when defining the medium-opposing surface (ABS), the ABS attains the same width with a high accuracy. Hence, when this thin-film magnetic head structure is used for making a thin-film magnetic head, the latter can be obtained with a track width which is controlled with a high accuracy.

Preferably, the thin-film magnetic head structure further comprises a base insulating layer including a magnetic pole forming depression sunken into a form corresponding to the main magnetic pole layer, the magnetic pole forming depression including a very narrow groove part having a substantially even width, the even width portion being formed in the very narrow groove part of the magnetic pole forming depression. In this case, the main magnetic pole layer is formed so as to be embedded in the magnetic pole forming depression.

Preferably, the magnetic pole forming depression includes a pair of variable width depressions continuously extending from respective end parts of the narrow groove part, each of the variable width depressions having a width increasing in a direction away from the narrow groove part; whereas the narrow groove part has such a width and length that a plating material grown in the variable width depression when forming the main magnetic pole layer by plating within the magnetic pole forming depression fills the narrow groove part without a gap. In this case, the plating material grown in the individual variable width depressions of the magnetic pole forming depression enters the narrow groove part from both ends thereof, whereby the narrow groove part can be filled more reliably.

Preferably, the even width portion has a length of 0.3 µm to 1.2 µm along the extending direction thereof, and a width of 0.2 µm or less.

It will be preferred if the main magnetic pole layer has an end face joint structure where respective end faces of the magnetic pole tip and a yoke magnetic pole part having a size greater than that of the magnetic pole tip are joined to each other. The conventional PMRs have been problematic in that they cause a phenomenon known as pole erasure by which data recorded beforehand on a hard disk is erased when information is further recorded at a high density. The pole erasure is a phenomenon in which, after data is written on a recording medium (hard disk) having a high maximum coercivity Hc, a leakage magnetic flux flows from the ABS to the hard disk even when no write current flows through a thin-film coil, thereby erasing the other data. The end face joint between the magnetic pole tip and yoke magnetic pole part can prevent the pole erasure from occurring.

Preferably, the narrow groove part is formed such that a groove width intersecting the length thereof gradually decreases along the depth thereof. In this case, the main magnetic pole layer including a bevel-formed magnetic pole tip is obtained.

In another aspect, the present invention provides a method of manufacturing a thin-film magnetic head structure adapted to manufacture a thin-film magnetic head configured such that a main magnetic pole layer including a magnetic pole tip on a side of a medium-opposing surface opposing a recording medium, a write shield layer opposing the magnetic pole tip so as to form a recording gap layer on the medium-opposing surface side, and a thin-film coil wound about the write shield layer or main magnetic pole layer are laminated; the method comprising the step of forming the magnetic pole tip of the main magnetic pole layer such that at least a part of the magnetic pole tip becomes an even width portion having a substantially even width along an extending direction.

This method of manufacturing the thin-film magnetic head structure forms a main magnetic pole layer comprising a magnetic pole tip including an even width portion. Therefore, if the main magnetic pole layer is cut at the even width portion of the magnetic pole tip when defining the medium-opposing surface (ABS) in the thin-film magnetic head made by this manufacturing method, the ABS attains the same width with a high accuracy. Hence, when the thin-film magnetic head structure made by this manufacturing method is used for making a thin-film magnetic head, the latter can be obtained with a track width which is controlled with a high accuracy.

It will be preferred if the step of forming the magnetic pole tip of the main magnetic pole layer includes the steps of forming a base insulating layer including a magnetic pole forming depression sunken into a form corresponding to the main magnetic pole layer, the magnetic pole forming depression including a narrow groove part having a substantially even width; and filling the magnetic pole forming depression with a magnetic material so as to form the main magnetic pole layer and form the even width portion within the narrow groove part.

Preferably, the magnetic pole forming depression includes a pair of variable width depressions continuously extending from respective tips of the narrow groove part, each of the variable width depressions having a width increasing in a direction away from the narrow groove part; whereas, when forming the even width portion by plating within the narrow groove part, a plating material grown in the variable width depression fills the narrow groove part without a gap. In this case, the plating material grown in the individual variable width depressions of the magnetic pole forming depression enters the narrow groove part from both ends thereof, thereby filling the narrow groove part.

It will be preferred if the step of forming the main magnetic pole layer includes the steps of forming an end-face-equipped magnetic pole layer having an in-depression end face exposed into a region other than the narrow groove part in the magnetic pole forming depression of the base insulating layer; and forming a joining magnetic pole layer joined to the in-depression end face in the end-face-equipped magnetic pole layer.

When forming the main magnetic pole layer, the magnetic material filling the narrow groove part in the magnetic pole forming depression may be made thicker than the magnetic material filling a region other than the narrow groove part.

In still another aspect, the present invention provides a thin-film magnetic head configured such that a main magnetic pole layer including a magnetic pole tip on a side of a medium-opposing surface opposing a recording medium, a write shield layer opposing the magnetic pole tip so as to form a recording gap layer on the medium-opposing surface side, and a thin-film coil wound about the write shield layer or main magnetic pole layer are laminated; wherein the magnetic pole tip of the main magnetic pole layer includes an even width portion having a substantially even width along an extending direction.

In this thin-film magnetic head, a main magnetic pole layer comprising a magnetic pole tip including an even width portion is formed. Therefore, the width in the medium-opposing surface (ABS) is controlled with a high accuracy. Hence, the track width is controlled with a high accuracy in this thin-film magnetic head.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 1 is a sectional view of the thin-film magnetic head structure in accordance with an embodiment of the present invention, in which FIG. 1A is a sectional view taken along a direction intersecting a thin-film coil, and FIG. 1B is a sectional view showing the ABS when cut at the ABS;

FIG. 2 is a view showing an insulating layer, in which

FIG. 3 is a view showing a major part of FIG. 2 under magnification, in which

FIG. 6 is a plan view or sectional view in a step subsequent to FIG. 5, in which

FIG. 8 is a plan view or sectional view in a step subsequent to FIG. 6, in which FIG. 8A is a plan view, FIG. 8B is a sectional view taken along the line 8B of FIG. 8A, FIG. 8C is a plan view showing a major part of FIG. 8A under magnification, and FIG. 8D is a sectional view taken at the ABS in FIG. 8B;

FIG. 9 is a plan view or sectional view in a step subsequent to FIG. 8, in which

FIG. 11 is a sectional view in a step subsequent to FIG. 9, in which FIG. 1A is a sectional view taken along a direction intersecting the thin-film coil, and FIG. 1B is a sectional view showing the ABS when cut at the ABS;

FIG. 12 is a sectional view in a step subsequent to FIG. 11, in which FIG. 12A is a sectional view taken along a direction intersecting the thin-film coil, and FIG. 12B is a sectional view showing the ABS when cut at the ABS;

FIG. 13 is a sectional view in a step subsequent to FIG. 12, in which FIG. 13A is a sectional view taken along a direction intersecting the thin-film coil, and FIG. 13B is a sectional view showing the ABS when cut at the ABS;

FIG. 15 is a plan view or sectional view in a step lead to FIG. 8, in which FIG. 16 is a plan view or sectional view in a step subsequent to FIG. 15, in which FIG. 16A is a plan view, FIG. 16B is a sectional view taken along the line 16B of FIG. 16A, FIG. 16C is a plan view showing a major part of FIG. 16A under magnification, and FIG. 16D is a sectional view taken at the ABS in FIG. 16B;

FIG. 18 is a plan view showing a conventional method of manufacturing a thin-film magnetic head, in which

FIG. 19 is a plan view showing the main magnetic pole layer in a conventional thin-film magnetic head, in which

FIG. 20 is a sectional view showing the conventional method of manufacturing a thin-film magnetic head, in which

FIG. 21 is a sectional view showing the conventional method of manufacturing a thin-film magnetic head, in which

FIG. 22 is a sectional view showing a different method of manufacturing a thin-film magnetic head structure, in which

FIG. 23 is a view showing the main magnetic pole layer after being cut along the ABS, in which

FIG. 25 is a view showing an example of conventional thin-film magnetic head, in which FIG. 25A is a sectional view, FIG. 25B is a front view, and FIG. 25C is a plan view showing the main magnetic pole layer;

FIG. 26 is a sectional view of the thin-film magnetic head structure in accordance with Modified Example 1, in which FIG. 26A is a sectional view taken along a direction intersecting the thin-film coil, and FIG. 26B is a sectional view showing the ABS when cut at the ABS;

FIG. 27 is a sectional view of the thin-film magnetic head structure in accordance with Modified Example 2, in which FIG. 27A is a sectional view taken along a direction intersecting the thin-film coil, and FIG. 27B is a sectional view showing the ABS when cut at the ABS;

FIG. 28 is a sectional view of the thin-film magnetic head structure in accordance with Modified Example 3, in which FIG. 28A is a sectional view taken along a direction intersecting the thin-film coil, and FIG. 28B is a sectional view showing the ABS when cut at the ABS;

FIG. 29 is a sectional view of the thin-film magnetic head structure in accordance with Modified Example 4, in which FIG. 29A is a sectional view taken along a direction intersecting the thin-film coil, and FIG. 29B is a sectional view showing the ABS when cut at the ABS;

DESCRIPTION OF THE PREFERRED EMBODIMENTS

Figure 2A:
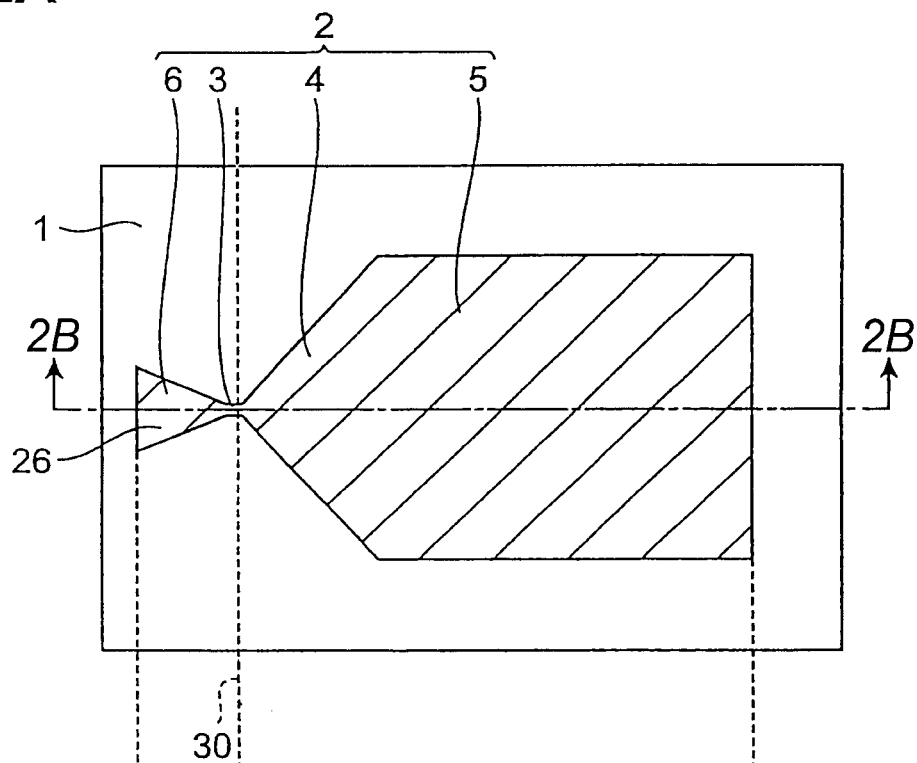
FIG. 2A is a plan view.

In the following, embodiments of the present invention will be explained with reference to the drawings. Constituents identical to each other will be referred to with numerals identical to each other without repeating their overlapping descriptions.

Configuration of Thin-Film Magnetic Head Structure

First, with reference to FIGS. 1 to 4, the configuration of the thin-film magnetic head structure in accordance with an embodiment of the present invention will be explained. FIG. 1 is a sectional view of a thin-film magnetic head structure 300 in accordance with the embodiment of the present invention, in which FIG. 1A a sectional view taken along a direction intersecting a thin-film coil, and FIG. 1B is a sectional view showing the ABS when cut at the ABS.

The thin-film magnetic head structure 300 has a configuration adapted to manufacture a magnetic head for perpendicular recording. The thin-film magnetic head structure 300 is formed on a substrate which is not depicted, and yields a thin-film magnetic head 300A in the present invention when cut at an ABS 30 which is a medium-opposing surface opposing a recording medium (hard disk).

The thin-film magnetic head structure 300 comprises a substrate; a reproducing head structure, laminated on the substrate, for manufacturing a reproducing head comprising an MR device (magnetoresistive device) or the like; and a recording head structure for manufacturing a recording head. FIGS. 1A and 1B show the recording head structure laminated on the insulating layer 1, while omitting the substrate and the reproducing head structure.

The configuration of a major part of the recording head structure in the thin-film magnetic head structure 300 will be explained in the following, whereas the configuration of the other parts will be explained in manufacturing steps which will be set forth later. Each constituent in the recording head structure will be explained with the same name and numeral before and after being cut at the ABS 30 unless otherwise specified in particular. When distinguishing these states from each other, however, "'" will be added to the numeral referring to the state after being cut at the ABS 30.

As shown in FIG. 1, the thin-film magnetic head structure 300 comprises the insulating layer 1, and a main magnetic pole layer 10, a recording gap layer 24, a write shield layer 40, a back magnetic pole layer 51, and a thin-film coil 100 which are laminated on the insulating layer 1.

Figure 2B:
FIG. 2B is a sectional view taken along the line 2B of FIG. 2A.
Figure 3A:
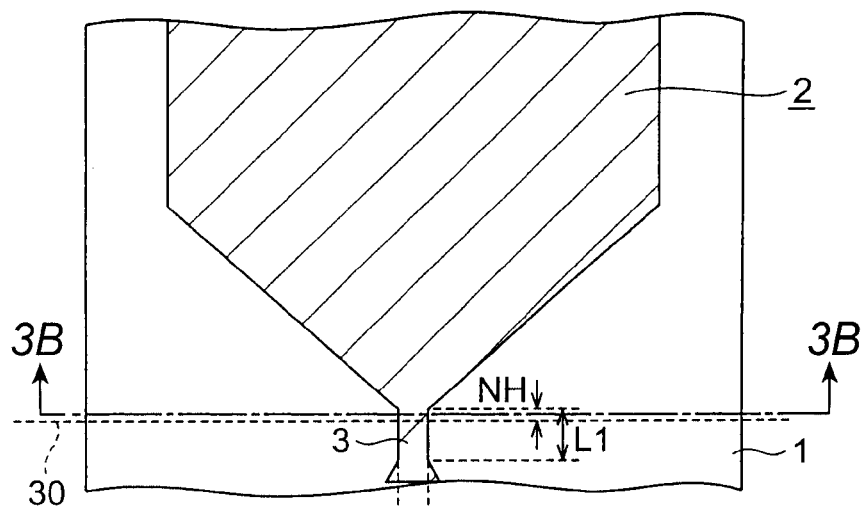
FIG. 3A is a plan view.
Figure 3B:
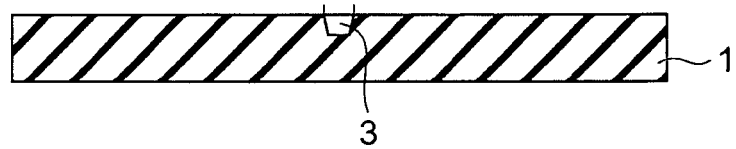
FIG. 3B is a sectional view taken along the line 3B of FIG. 3A.
Figure 3C:
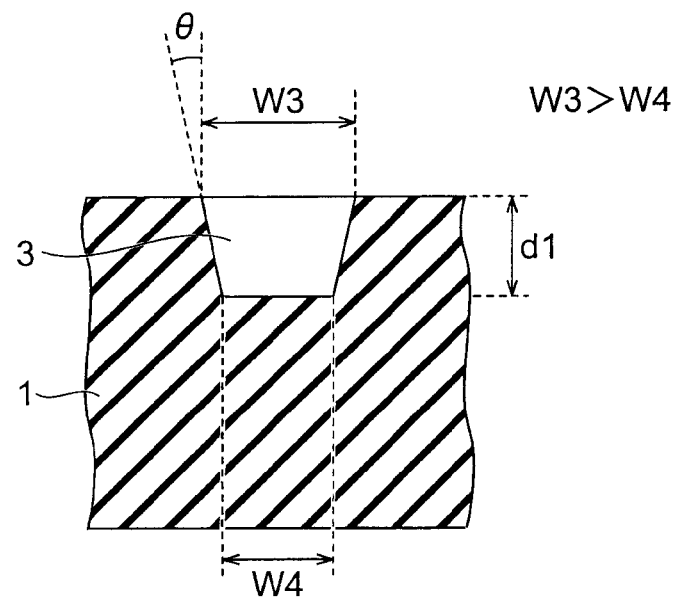
FIG. 3C is a sectional view showing the major part in FIG. 3B under magnification.

The insulating layer 1 is the base insulating layer in the present invention and is formed in a predetermined region on the substrate. FIG. 2 is a view showing the insulating layer 1, in which FIG. 2A is a plan view, and FIG. 2B is a sectional view taken along the line 2B of FIG. 2A. FIG. 3 is a view showing a major part of FIG. 2 under magnification, in which FIG. 3A is a plan view, FIG. 3B is a sectional view taken along the line 3B of FIG. 3A and FIG. 3C is a sectional view showing the major part in FIG. 3B under magnification. In the insulating layer 1, FIG. 2 shows a rectangular predetermined region centered at a cavity 2 which will be explained later.

The insulating layer 1 is made of alumina ($Al_2O_3$) and has the cavity 2 at a center part (hatched part in FIGS. 2A and 3A) on the side of a surface to be formed with a recording head. The cavity 2 is the magnetic pole forming depression in the present invention, and is sunken into a form corresponding to the outer form of the main magnetic pole layer 10 in order to form the main magnetic pole layer 10 in set dimensions and shape. Namely, as will be explained later in detail, the cavity 2 is formed earlier than the main magnetic pole layer 10, such that its dimensions and shape including the depth d1 (about 0.25 μm to 0.35 μm, preferably 0.3 μm), width, and length coincide with assumed thickness, width, and length of the main magnetic pole layer 10. The cavity 2 includes a very narrow groove part 3, a variable width depression 4, a fixed width depression 5, and a protruded depression 6, whereas a magnetic material embedded therein forms the main magnetic pole layer 10.

The very narrow groove part 3 is formed so as to define the track width of the thin-film magnetic head, and has a structure adapted to improve the recording density by reducing the track width. As shown in FIG. 3, the length of the narrow groove 3 is set to L1 (longer than a neck height NH which will be explained later, i.e., L1>NH) such that the ABS 30 can be secured in an intermediate part of the length. The groove width intersecting the length is W3 on the surface side, and is W4 on the lower side, whereas the groove widths W3 and W4 are made narrower than the variable width depression 4 and fixed width depression 5 as much as possible, so as to yield a very narrow structure in order to improve the recording density of the thin-film magnetic head. Also, the groove width is gradually narrowing along the depth such that a magnetic pole tip 11 which will be explained later has a bevel form. Namely, the groove width W4 is smaller than the groove width W3 (W3>W4) in the narrow groove part 3, so that the bevel angle θ shown in FIG. 3C becomes about 7 to 12 degrees (e.g., 10 degrees).

The variable width depression 4 continuously extends from one end part of the very narrow groove part 3, whereas the protruded depression 6 continuously extends from the other end part. Each of the variable width depression 4 and protruded depression (a pair of variable width depressions) gradually increases its groove width in the direction away from the very narrow groove part 3. The variable width depression 4 is connected to the fixed width depression 5 having a constant groove width. The distance from the boundary part between the variable width depression 4 and the very narrow groove part 3 to the ABS 30 will later become the neck height NH.

Figure 4A:
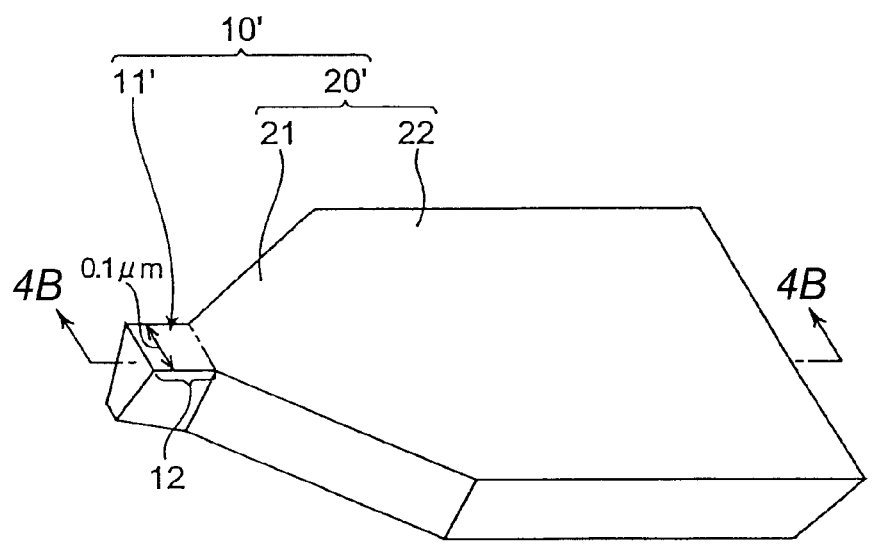
FIG. 4 is a view showing a main magnetic pole layer after being cut along the ABS, in FIG. 4A is a perspective view.
FIG. 4B is a sectional view taken along the line 4B of FIG. 4A.
Figure 4B:
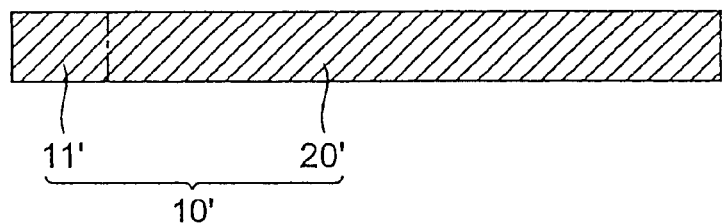

As shown in FIG. 4, the main magnetic pole layer 10' formed by using the above-mentioned cavity 2 (as with the main magnetic pole layer 10 before cutting) comprises a magnetic pole tip 11' and a yoke magnetic pole part 20', whereas its surface on the side closer to the thin-film coil 100 has a stepless flat structure. FIG. 4 is a view showing the main magnetic pole layer 10' after being cut along the ABS 30, in which FIG. 4A is a perspective view, and FIG. 4B is a sectional view taken along the line 4B of FIG. 4A. The main magnetic pole layer 10' is formed so as to be embedded in the cavity 2.

The magnetic pole tip 11' (as with the magnetic pole tip 11 before cutting) is disposed at a position closer to the ABS 30 than is the yoke magnetic pole part 20'. The magnetic pole tip 11' extends along a direction intersecting the ABS 30, and is formed with an even width portion 12 throughout its length. The even width portion 12 is a part defining the track width of the thin-film magnetic head in accordance with the present invention, and has an even width of 0.1 μm throughout the length of the magnetic pole tip 11'.

The magnetic pole tip 11' has a width determined by the very narrow groove part 3. Along the ABS 30, the magnetic pole tip 11' has a width W1 on the side closer to the thin-film coil 100, and a width W2 on the side distant from the thin-film coil 100, thereby yielding a bevel form whose width gradually narrows in the direction away from the thin-film coil 100 (W1>W2, whereas the width W1 is the track width; see FIG. 1). The magnetic pole tip 11' has a narrow track width structure in which the above-mentioned W1 is narrowed in order to enhance the recording density of data due to the thin-film magnetic head. The widths W1 and W2 correspond to the groove widths W3 and W4 of the very narrow groove part 3 in the cavity 2, respectively. The length of the magnetic pole tip 11' (distance from the ABS 30) corresponds to the neck height NH (which is on the order of 0.1 μm to 0.3 μm, preferably 0.15 μm in this embodiment).

The yoke magnetic pole part 20' is integrally formed with the magnetic pole tip 11' from the same magnetic material, and has a size (area) greater than that of the magnetic pole tip 11'. The yoke magnetic pole part 20' comprises a variable width region 21 whose width gradually increases in the direction away from the ABS 30, and a fixed width region 22 having a constant width. The variable width region 21 is formed continuously from the magnetic pole tip 11' on the side distant from the ABS 30. The fixed width region 22 is formed continuously from the variable width region 21 on the side distant from the ABS 30. At a position distant from the ABS 30 than is the recording gap layer 24, the fixed width region 22 is magnetically connected to the back magnetic pole layer 51.

Referring to FIG. 1 again, the recording gap layer 24 is interposed between the main magnetic pole layer 10 and a first shield part 41 of the write shield layer 40, which will be explained later, the insulating layer 31, and the back magnetic layer 51.

The write shield layer 40 comprises the first shield part 41, a second shield part 42, and a third shield part 43. The first shield part 41 is formed so as to oppose the magnetic pole tip 11 of the main magnetic pole layer 10 by way of the recording gap layer 24 on the ABS 30 side, whereby the neck height NH is determined by the distance from the ABS 30 in a direction intersecting the ABS 30. The second shield part 42 is formed so as to connect with the first shield part 41 and back magnetic pole layer 51 from the side closer to the thin-film coil 100, and has a height equivalent to the thickness of the thin-film coil 100. The third shield part 43 is formed so as to connect with the second shield part 42 and cover the thin-film coil 100 and a photoresist 101 by way of an insulating layer 32.

The back magnetic pole layer 51 is connected to the yoke magnetic pole part 20 in a part distant from the ABS 30 than is the recording gap layer 24. The back magnetic pole layer 51 is magnetically connected to the second shield part 42, and forms a joint 44 together with the second shield part 42.

By way of the recording gap layer 24 and the insulating layer 31, the thin-film coil 100 is formed so as to ride on the variable width region 21 and fixed width region 22 of the yoke magnetic pole part 20'. The thin-film coil 100 is wound in a planar spiral about the write shield layer 40 while being insulated therefrom by the insulating layers 31, 32. The thin-film magnetic head 100 may be changed to a helical coil spirally wound about the main magnetic pole layer 10 as appropriate.

Thus configured thin-film magnetic head structure 300 is cut so as to form the ABS 30 in an intermediate part of the very narrow groove part 3, whereby the thin-film magnetic head 300A in accordance with the present invention (see FIG. 1) is obtained.

As explained in detail in the foregoing, the even width portion 12 molded by the very narrow groove part 3 is formed in the magnetic pole tip 11 of the main magnetic pole layer 10. Therefore, when the intermediate portion of the very narrow groove part 3 is cut so as to form the ABS 30 in the manufacturing of the thin-film magnetic head, the main magnetic pole layer 10 is cut at the even width portion 12 of the magnetic pole tip 11. Since the even width portion 12 has an even width (i.e., W1 does not change throughout the length), the width W1 of the magnetic pole tip 11' (i.e., track width) appearing in the cross section (ABS 30) does not vary even when the cut position fluctuates within the area where the even width portion 12 extends.

In conventional magnetic head structures in which the width of the magnetic pole tip is not sufficiently even, the width of the magnetic pole tip appearing in the ABS may vary when the position to cut the ABS fluctuates, whereby the track width may vary among products. When the thin-film magnetic head structure 300 including the even width portion 12 in the magnetic pole tip 11 is used for making a thin-film magnetic head, by contrast, the thin-film magnetic head in which the track width is controlled with a high accuracy can be obtained.

Method of Manufacturing Thin-Film Magnetic Head

With reference to FIGS. 5, 6, 8, 9 and 11 to 13 in addition to FIGS. 1 to 4 mentioned above, a method of manufacturing the thin-film magnetic head structure 300 having the above-mentioned configuration will be explained.

Figure 5C:
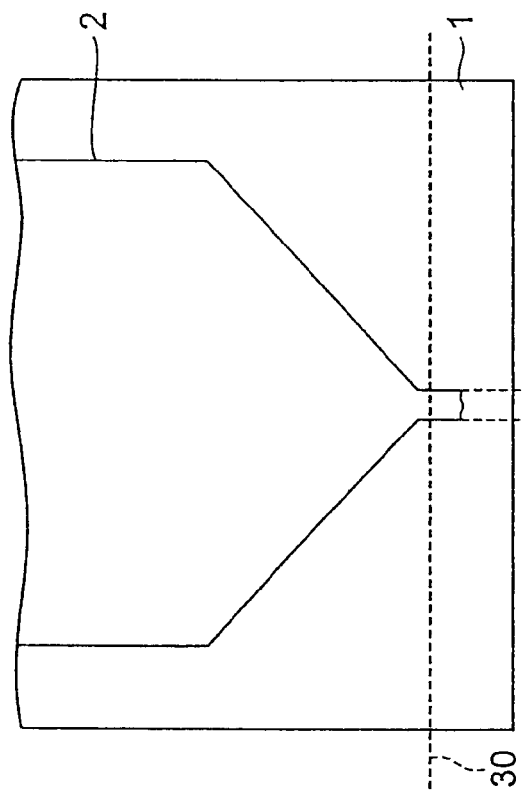
FIG. 5C is a plan view showing a major part of FIG. 5A under magnification.
Figure 5D:
FIG. 5D is a sectional view taken at the ABA in FIG. 5B.
Figure 5A:
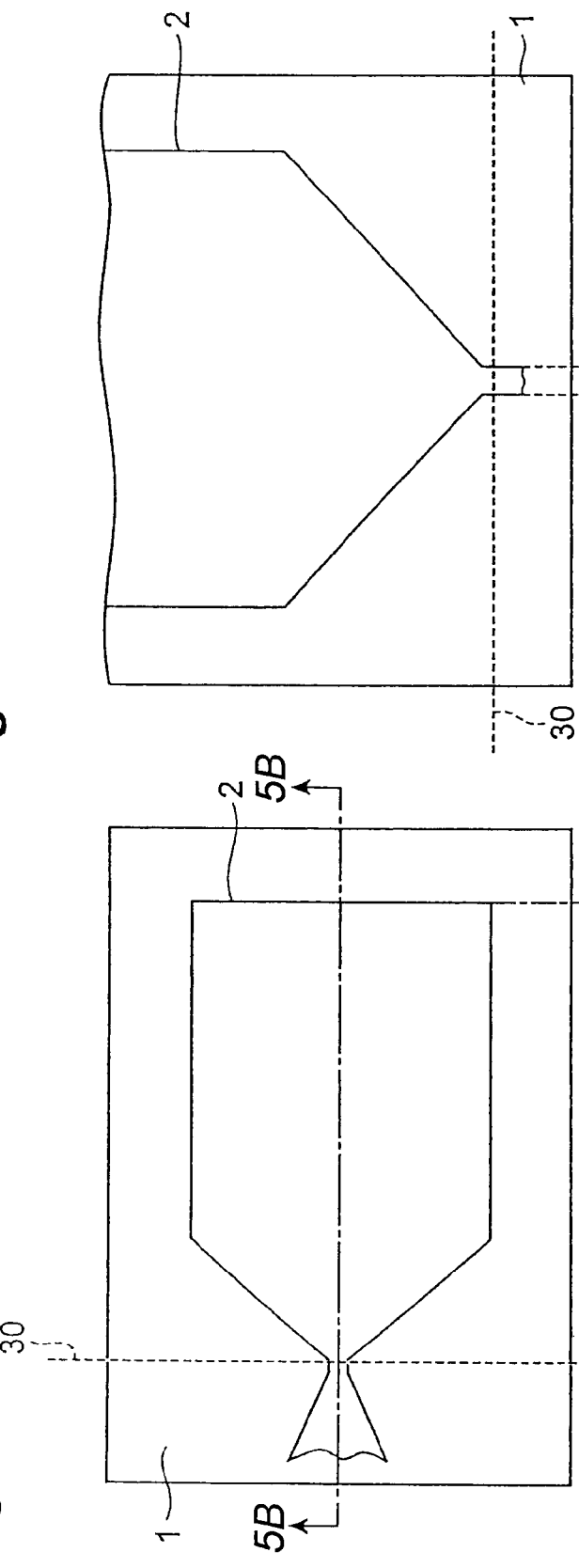
FIG. 5 is a plan view or sectional view in a step of the manufacturing method, in FIG. 5A is a plan view.
FIG. 5B is a sectional view taken along the line 5B of FIG. 5A.
Figure 5B:
Figure 6A:
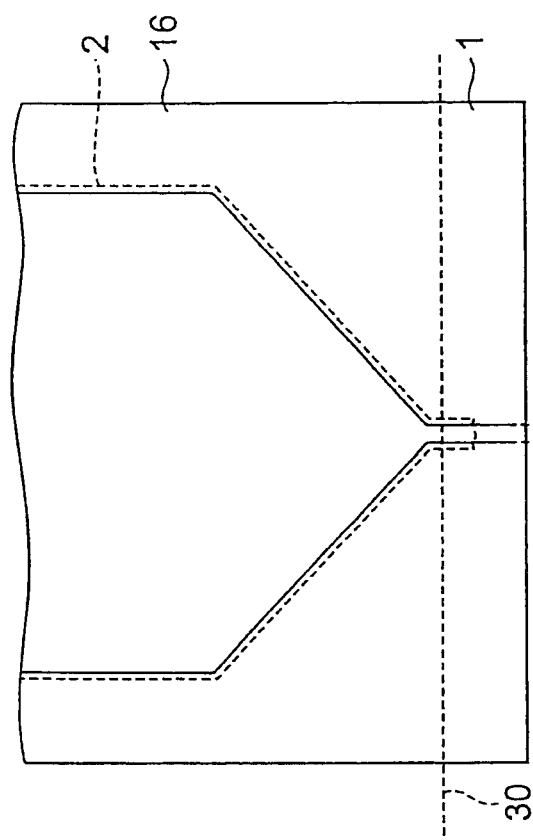
FIG. 6A is a plan view.
Figure 6B:
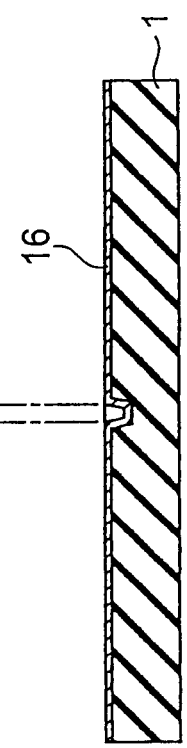
FIG. 6B is a sectional view taken along the line 6B of FIG. 6A.
Figure 6C:
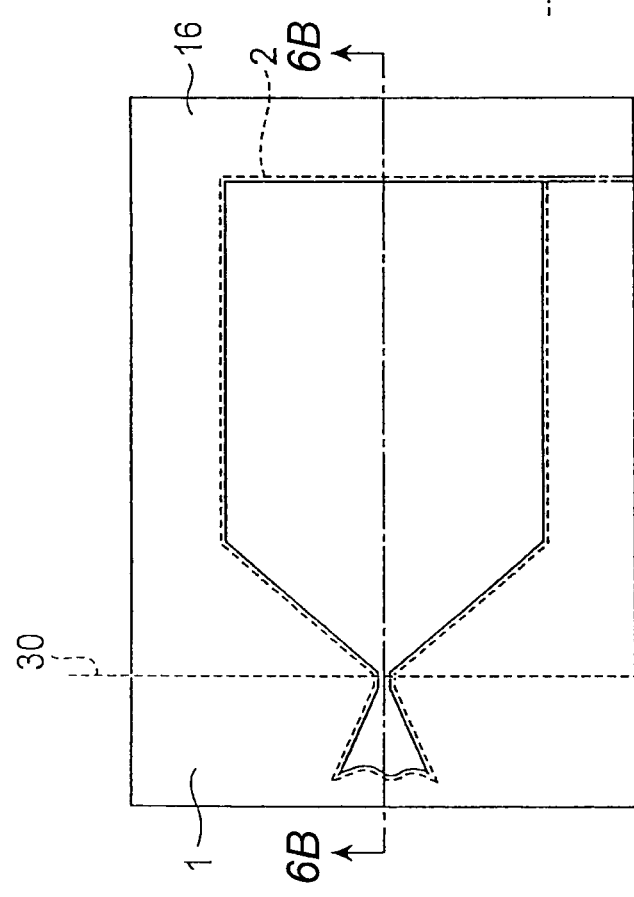
FIG. 6C is a plan view showing a major part of FIG. 6A under magnification.
Figure 6D:
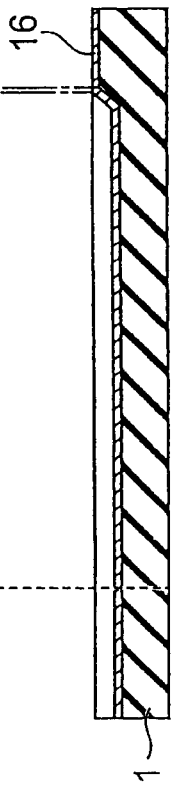
FIG. 6D is a sectional view taken at the ABS in FIG. 6B.

FIGS. 5, 6, 8, and 9 are plan or sectional views in respective steps of the manufacturing method, in which FIGS. 5A, 6A, 8A and 9A are plan views, and FIGS. 5B, 6B, 8B and 9B are sectional views taken along the lines 5B of FIGS. 5A, 6B of 6A, 8B of 8A and 9B of 9A, respectively. FIGS. 5C, 6C, 8C and 9C are plan views showing a major part of FIGS. 5A, 6A, 5A, 8A and 9A, respectively, under magnification, and FIGS. 5D, 6D, 8D and 9D are sectional views taken at the Abs 30 of FIGS. 5B, 6B, 8B and 9B, respectively. FIGS. 11 to 13 are plan or sectional views in respective steps of the manufacturing method, in which FIGS. 11A, 12A and 13A are sectional views taken along a plane orthogonal to the ABS, whereas FIGS. 11B, 12B and 13B are sectional views taken at the ABS 30 in FIGS. 11A, 12A and 13A.

First, for making the thin-film magnetic head structure 300, a reproducing head structure comprising an MR device (magnetoresistive device) and the like is laminated on an undepicted substrate made of aluminum oxide titanium carbide ($Al_2O_3 \cdot TiC$), for example. Subsequently, an insulating layer 1 is formed from alumina ($Al_2O_3$) or a nonmagnetic material.

After a photoresist is applied onto the insulating layer 1, patterning is performed with a predetermined photomask, so as to form a resist pattern exposing the surface of the insulating layer 1 into a form corresponding to the cavity 2. Using this resist pattern as a mask, reactive ion etching (hereinafter referred to as "RIE") is carried out, so as to remove the part of insulating layer 1 not covered with the resist pattern, whereby the cavity 2 is formed as shown in FIGS. 2A and 2B, and FIGS. 5A, 5B, 5C and 5D.

Figure 7:
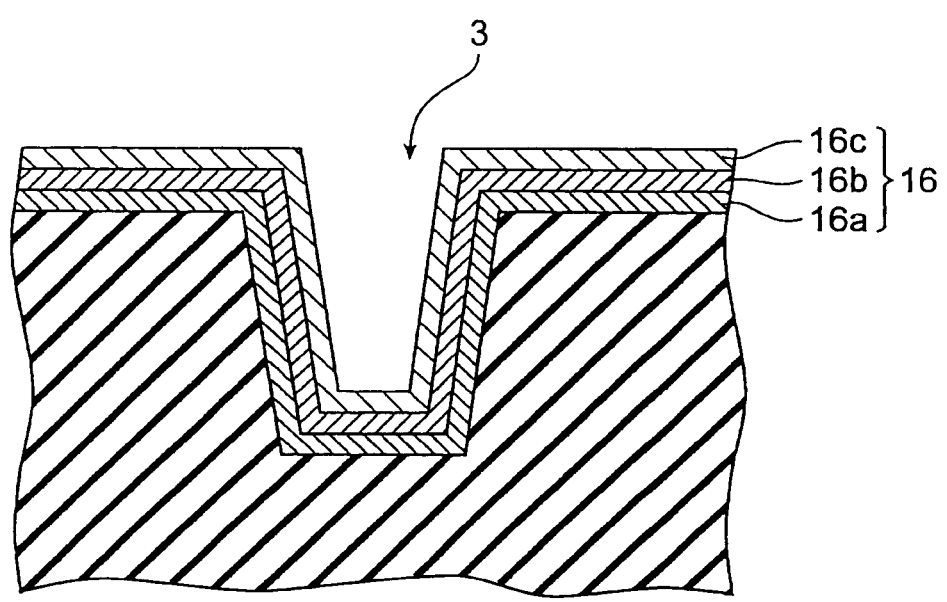
FIG. 7 is an enlarged view of a major part in FIG. 6, showing the configuration of a coating formed in a narrow groove part of FIG. 6D.
Figure 9A:
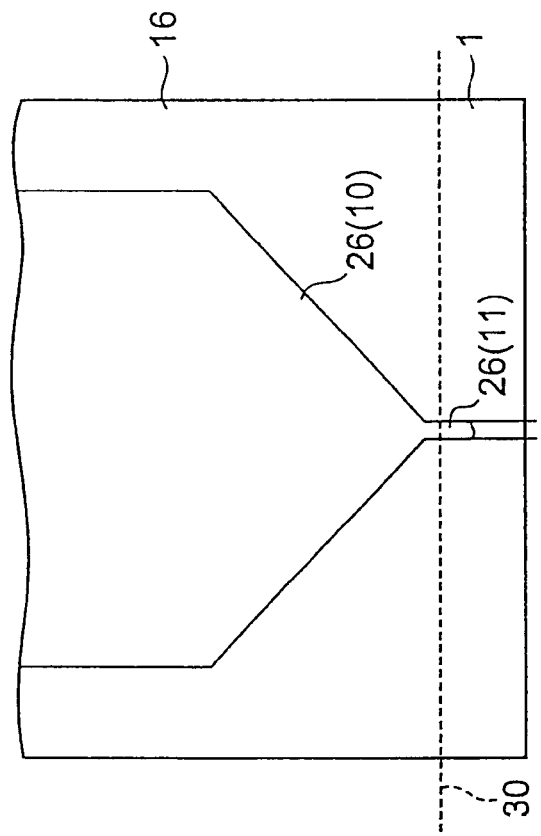
FIG. 9A is a plan view.
Figure 9B:
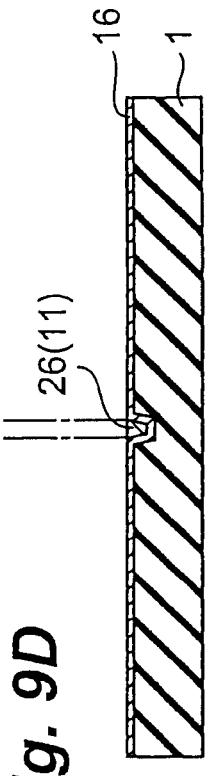
FIG. 9B is a sectional view taken along the line 9B of FIG. 9A.
Figure 9C:
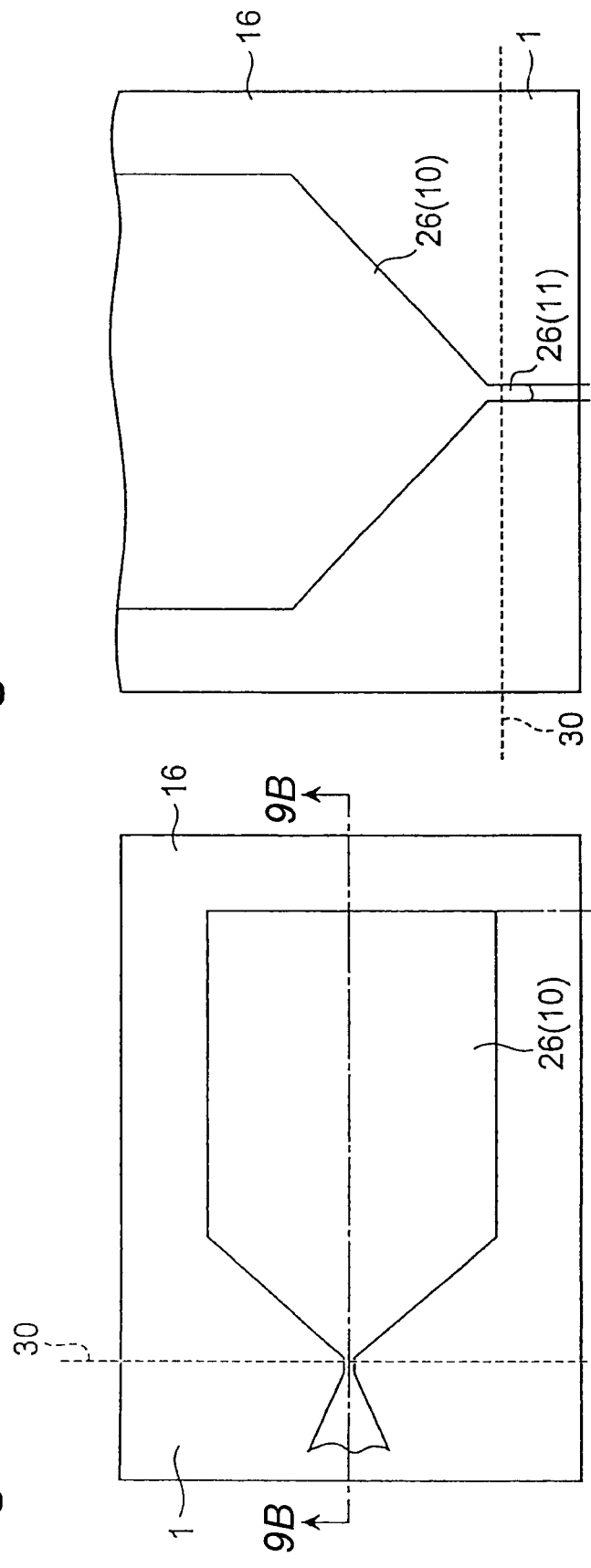
FIG. 9C is a plan view showing a major part of FIG. 9A under magnification.
Figure 9D:
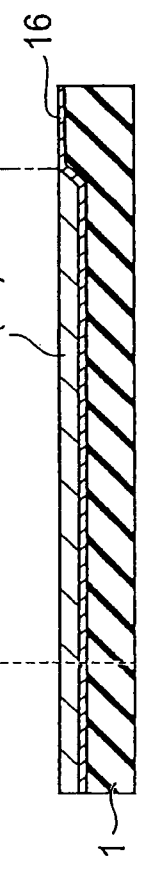
FIG. 9D is a sectional view taken at the ABS in FIG. 9B.

Next, as shown in FIG. 6, a coating 16 is formed on the whole surface of the insulating layer 1. As shown in FIG. 7, the coating 16 has a three-layer structure in which an $Al_2O_3$ layer 16a, a Ta layer 16b, and a seed layer 16c are laminated successively from the side closer to the insulating layer 1. The $Al_2O_3$ layer 16a and the Ta layer 16b are formed in order to control dimensions (width and depth) of the very narrow groove part 3 formed by the RIE. The $Al_2O_3$ layer 16a and the Ta layer 16b are laminated by ALCVD and sputtering, respectively, so as to yield a thickness of about 200 to 500 Å in total. The seed layer 16c is used for plating the cavity 2 with a magnetic material, and is formed by a thickness of about 400 Å by sputtering or IBD (ion beam deposition). Since the Ta layer 16 can also be used as a seed layer at the time of plating with the magnetic material, the seed layer 16c can be omitted as appropriate.

As shown in FIG. 8, a magnetic layer 26 made of CoNiFe which is a magnetic material having a high saturated magnetic flux density (on the order of 2.3 T to 2.4 T) is formed by plating on the seed layer 16c of thus formed coating 16. The magnetic layer 26 has a thickness of about 0.7 µm, and will later become the main magnetic pole layer 10.

Figure 10:
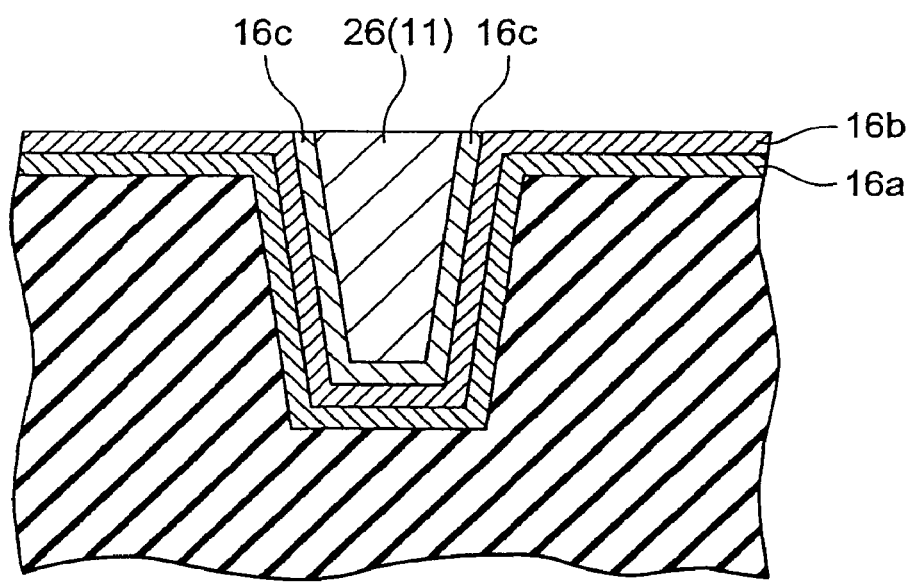
FIG. 10 is an enlarged view of a major part in FIG. 9, showing the configuration of a coating formed in a narrow groove part of FIG. 9D.

Subsequently, as shown in FIGS. 9 and 10, the whole surface of the substrate including the surface of the magnetic layer 26 on the side closer to the thin-film coil 100 is subjected to chemical mechanical polishing (hereinafter referred to as "CMP") which will end at the surface of the Ta layer 16b in the coating 16, so as to flatten the surface of the magnetic layer 26. As a consequence, the main magnetic pole layer 10 is formed so as to be embedded in the cavity 2. When the Ta layer 16b formed near the very narrow groove part 3 is used for detecting the end point of CMP as such, the amount of polishing near the very narrow groove part 3 can be adjusted with a high accuracy. Namely, the height of the magnetic pole tip 11 highly accurately coincides with the depth of the cavity 2 covered with the coating 16.

After the surface flattening, a recording gap layer 24, a first shield part 41, a back magnetic pole layer 51, and an insulating layer 31 are formed as shown in FIGS. 11A and 11B.

More specifically, a coating 34 for forming the recording gap layer 24 is formed by a thickness of 400 to 500 Å so as to cover the whole upper face of the substrate including the magnetic pole tip 11 and yoke magnetic pole part 20. The material of the coating 34 may be either an insulating material such as alumina or a nonmagnetic metal material such as Ru, NiCu, Ta, W, Cr, $Al_2O_3$, $Si_2O_3$, or NiPd. The coating 34 will later form the recording gap layer 24. Subsequently, while opening the coating 34 in areas where the first shield part 41 and the back magnetic pole layer 51 are to be formed, the first shield part 41 and the back magnetic pole layer 51 are formed. In this case, the first shield part 41 is formed so as to oppose the magnetic pole tip 11 by way of the recording gap layer 24 in order to determine the neck height NH. The back magnetic pole layer 51 is formed so as to join with the yoke magnetic pole part 20 at a position not covered with the recording gap layer 24. It will be sufficient if the first shield part 41 and the back magnetic pole layer 51 are formed by plating with CoNiFe or NiFe as a magnetic material as with the yoke magnetic pole part 20. Next, the insulating layer 31 made of alumina ($Al_2O_3$) is formed by a thickness of 1.0 µm to 1.5 µm, for example, so as to cover the whole upper face of the substrate.

Subsequently, in order for the first shield part 41 and the yoke magnetic pole part 20 to have a thickness on the order of 0.5 μm to 1.0 μm, their surface is subjected to CMP as a surface-flattening process. This forms an opening in a place where a second shield part 42 is to be formed. Then, as shown in FIG. 12, an electrode film (not depicted) made of a conductive material and a frame made by photolithography are formed on the insulating layer 31, and then electroplating is performed with the electrode film, so as to form a plating layer made of Cu. This plating layer and the electrode film thereunder become a thin-film coil 100. The thin-film coil 100 is formed on the yoke magnetic pole part 20 by way of the insulating layer 31.

Next, though not depicted, a frame is formed by photolithography, and the second shield part 42 is formed by frame plating. The second shield part 42 uses the same magnetic material as with the first shield part 41. The second shield part 42 and the thin-film coil 100 may be formed in reverse order as well.

Subsequently, a photoresist 101 is applied so as to cover the whole upper face of the substrate. Further, an insulating layer 35 made of alumina ($Al_2O_3$) is formed by a thickness of about 3.0 μm to 4.0 μm thereon, and then the whole surface is subjected to CMP as a surface-flattening process (see FIG. 13).

Subsequently, an insulating layer made of alumina ($Al_2O_3$) is formed by a thickness of about 0.2 μm so as to cover the whole upper face of the substrate, and an opening is formed in the place where the second shield part 42 is formed. This yields an insulating layer 32 which insulates the thin-film coil 100 and a third shield part 43 from each other so as to prevent them from short-circuiting. Finally, the third shield part 43 is formed by a thickness of about 2 μm to 3 μm, whereby the write shield layer 40 is formed. The foregoing steps yield the thin-film magnetic head structure 300 shown in FIGS. 1A and 1B.

Figure 14:
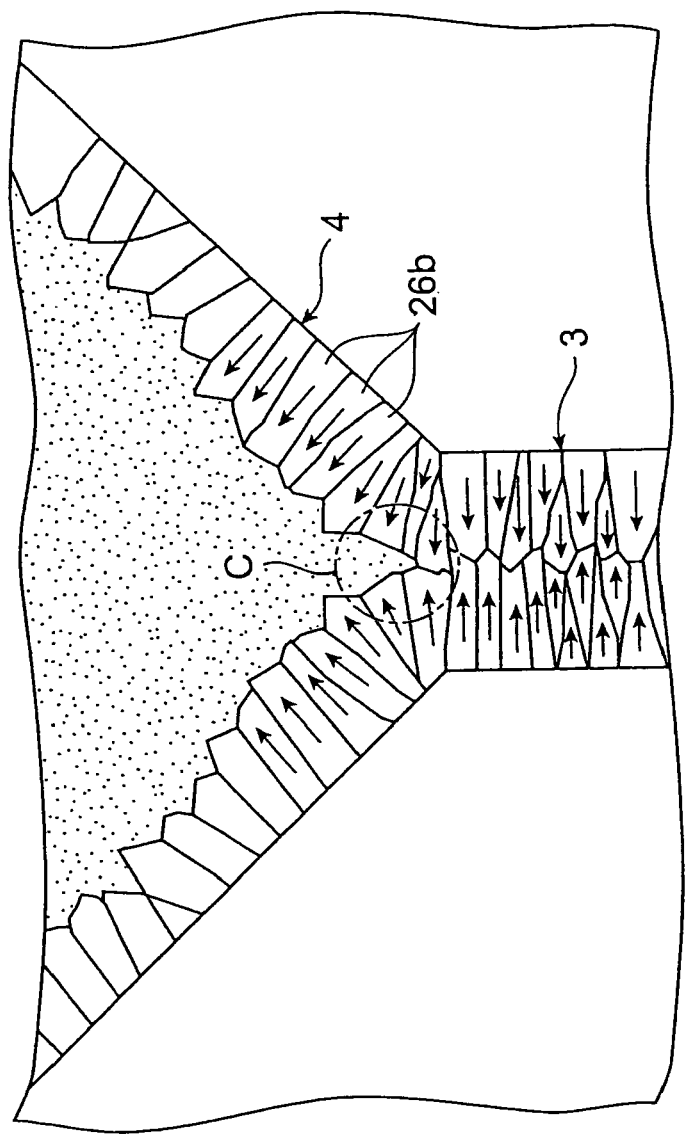
FIG. 14 is an enlarged view of a major part showing the state of the narrow groove part when a magnetic pole layer is formed in a cavity.
Figure 15C:
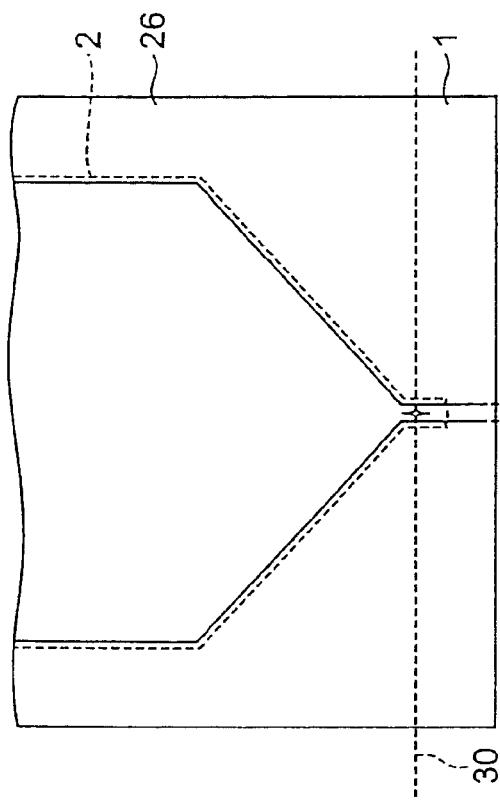
FIG. 15C is a plan view showing a major part of FIG. 15A under magnification.
Figure 15D:
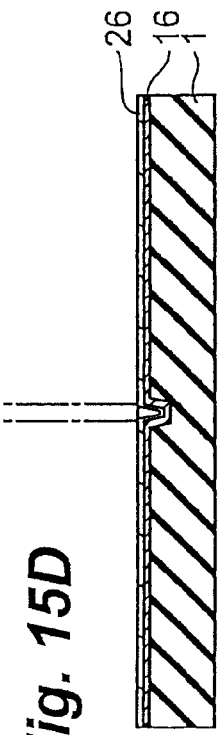
FIG. 15D is a sectional view taken at the ABS in FIG. 15B
Figure 15A:
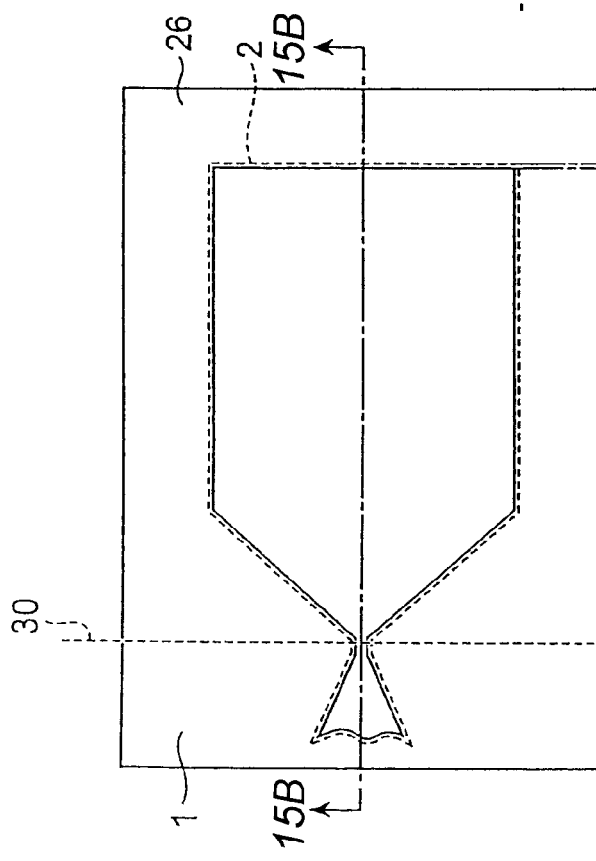
FIG. 15A is a plan view.
Figure 15B:
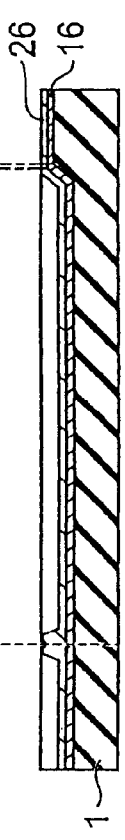
FIG. 15B is a sectional view taken along the line 15B of FIG. 15A.

The process of the cavity 2 covered with the coating 16 being filled with the magnetic layer 26 will now be explained with reference to FIGS. 14, 15, and 16.

When the forming of the magnetic layer 26 by plating is started from the state where the cavity 2 is formed with the coating 16 (the state shown in FIG. 6), the magnetic layer 26 gradually grows from the surface of the seed layer 16c of the coating 16 formed on the bottom and inner side faces of the cavity 2. Here, in the plating material (magnetic material) grown on the inner side face of the variable width depression 4 and protruded depression 6 (see FIG. 2), portions in the vicinity of the very narrow groove part 3 (see the circle C defined by a dash-single-dot line in FIG. 14) abut against each other, thereby entering the very narrow groove part from both sides thereof as shown in FIGS. 14 and 15. The arrow in FIG. 14 indicates the growing direction of anisotropically growing magnetic material crystals 26a. Thus, as shown in FIG. 15, the very narrow groove part 3 is filled with the portion of plating material grown therewithin and the portions of plating material grown in the variable width depression 4 and protruded depression 6 on both sides thereof. When the forming of the film by plating further advances, the magnetic layer 26 entering the very narrow groove part 3 from the variable width depression 4 and protruded depression 6 fills the very narrow groove part 3 without gaps as shown in FIG. 16.

The bottom area of the very narrow groove part 3 is smaller than that of the variable width depression 4 or protruded depression 6. Therefore, when the film is uniformly formed by plating on the seed layer 16c, the magnetic layer 26 formed on the very narrow groove part 3 becomes thicker than that formed in the other regions (i.e., the variable width depression 4, protruded depression 6, and fixed width depression 5) within the cavity 2. Further performing the forming of the film by plating yields the magnetic layer 26 filling the whole cavity 2 (see FIG. 8).

Figure 17:
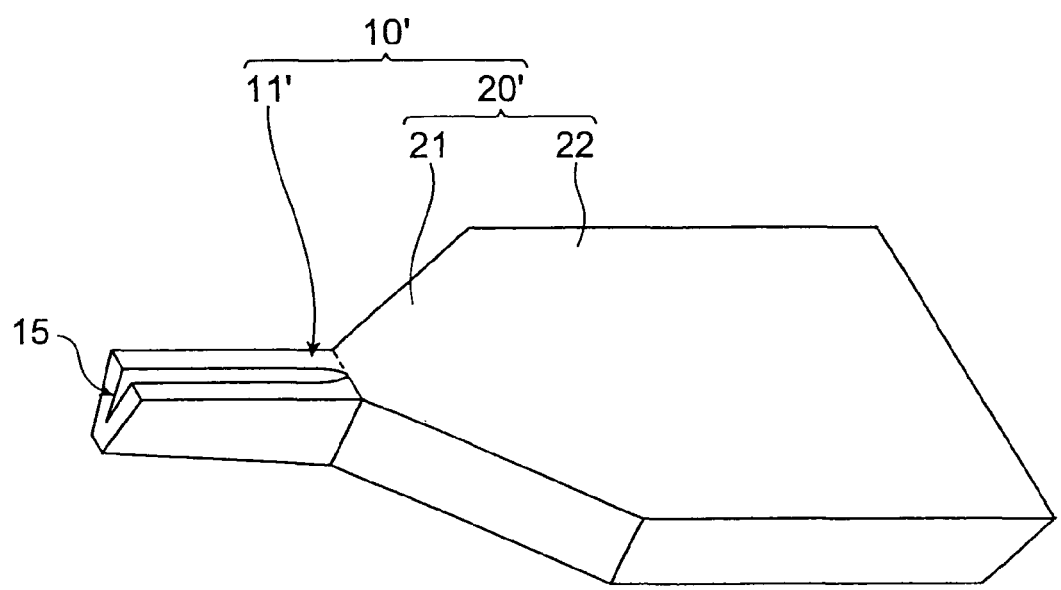
FIG. 17 is a view showing a keyhole occurring in a conventional main magnetic pole layer.

When the very narrow groove part 3 is too long, the magnetic layer 26 does not fully travel by way of both sides of the very narrow groove part 3 as mentioned above, thus generating a keyhole 15 in the magnetic pole tip 11' corresponding to the very narrow groove part 3 as shown in FIG. 17. The keyhole 15 extends along the magnetic pole tip 11' and has a substantially V-shaped cross section. Studies conducted by the inventors have elucidated that the keyhole 15 is not generated when the very narrow groove part 3 has a length of 1.2 μm or less. Since the coating 16 covering the very narrow groove part 3 is so thin that its thickness is negligible with respect to the length and width of the very narrow groove part 3, the length and width of the very narrow groove part 3 are substantially equal to those of the even width portion 12, respectively.

Namely, in order for the plating material grown in the variable width depression 4 and protruded depression 6 to enter the very narrow groove part 3 so that the latter is more reliably filled with the plating material, it will be preferred if the length of the very narrow groove part 3 (i.e., the length of the even width portion 12) is 1.2 μm or shorter (e.g., 0.8 μm). However, since the ABS is harder to cut when the length of the very narrow groove part 3 is less than 0.3 μm, it will be preferred if the very narrow groove part 3 has a length of at least 0.3 μm. In order for the length to be automatically measurable with CD-SEM, it will be more preferred if the very narrow groove part 3 has a length of at least 0.5 μm. When the width of the very narrow groove part 3 (i.e., the width of the even width portion 12) is 0.2 μm or less, the plating material is less likely to grow within the very narrow groove part 3. Therefore, the very narrow groove part having a length of 1.2 μm or less is quite effective in filling the narrow groove part 3 with the plating material without gaps.

The manufacturing method explained in the foregoing reliably forms the main magnetic pole layer 10 having the even width portion 12. Therefore, when the thin-film magnetic head structure 300 made by this manufacturing method is used for making a thin-film magnetic head, the thin-film magnetic head can be obtained with a highly accurately controlled track width.

Figure 18A:
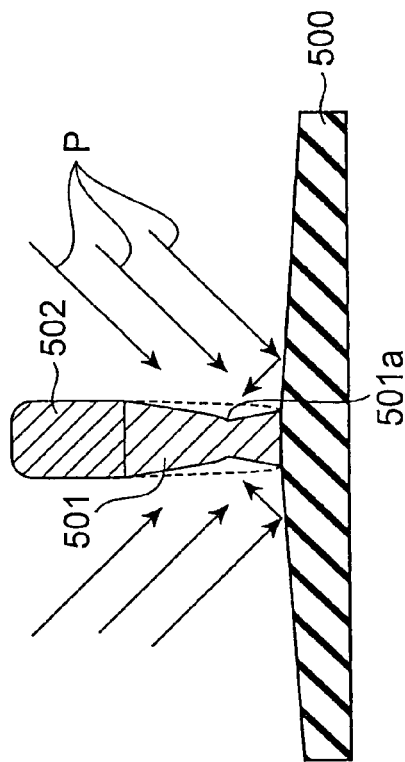
FIG. 18A and FIG. 18B show respective states before and after etching.

In order to for the ABS-side portion of the magnetic pole tip in the main magnetic pole layer to be formed like a bevel, the following procedure has been employed in conventional PMRs. Namely, in the conventional PMRs, there has been a case where, as shown in FIG. 18A, a main magnetic pole layer 501 formed on an insulating layer 500 is formed with an insulating layer 502 made of alumina, and is subjected to ion beam etching (hereinafter referred to as "IBE") by direct irradiation with ion beams P. In this case, the speed at which the insulating layer 500 is etched by the IBE varies depending on the ion beam irradiation. Namely, depending on the distance from the beam center, barriers (e.g., the variable width region 21 of the above-mentioned yoke magnetic pole part 20) inhibiting the magnetic pole tip from being irradiated with the beams, etc., there have been respective portions with higher and lower etching speeds. Therefore, a main magnetic pole layer including a magnetic pole tip having an even width has not been obtained by any means. Hence, as mentioned above, the width of the magnetic pole tip appearing in the ABS may vary when the position to cut the ABS fluctuates, whereby the track width may vary among products.

Figure 18B:
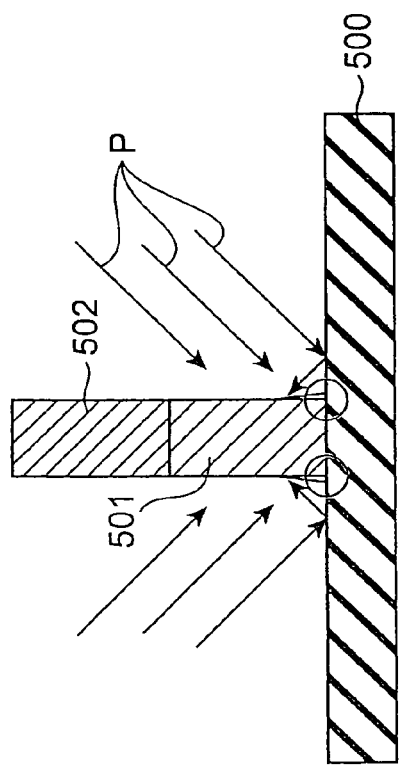

Also, in the conventional PMRs, the etching speed by the IBE is slower in the magnetic pole tip in the main magnetic pole layer 501 than in the insulating layer 500, whereby the IBE must be performed for a long time in order for the magnetic pole tip to attain a bevel form. As a consequence, the ABS-side portion of the magnetic pole tip tends to have a form including a narrowed part 501a having a smaller diameter as shown in FIG. 18B.

Figure 19A:
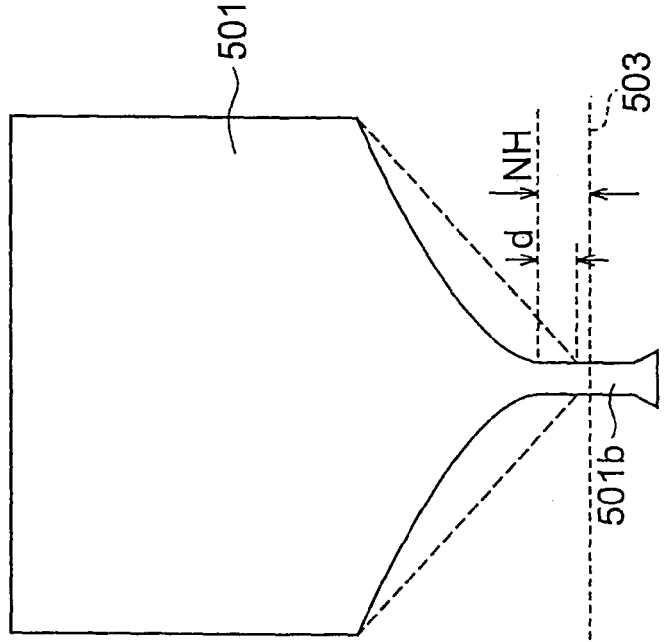
FIG. 19A shows the main magnetic pole layer as set.
Figure 19B:
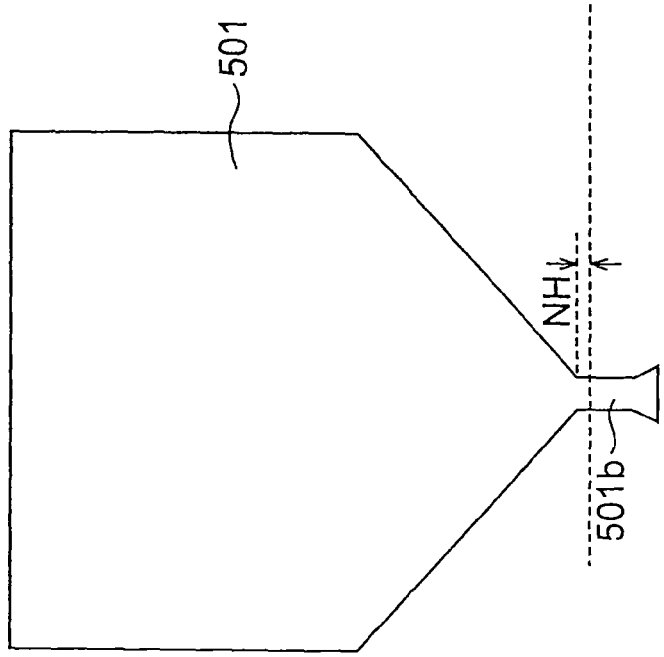
FIG. 19B shows the manufactured main magnetic pole layer.

In addition, even when the main magnetic pole layer 501 is intended to be formed as shown in FIG. 19A, a rear end portion (flare point) of a narrow band part 501b having a width corresponding to the track width may retract as shown in FIG. 19B, so as to yield a flare point, thereby making the neck height NH longer than its expected length (about 0.15 µm) by d (about 0.2 µm to 0.3 µm). In general, the position at which the magnetic pole tip of the main magnetic pole layer is cut is determined by the distance from the above-mentioned flare point, so that the position of the flare point is hard to specify when an edge of the flare point retracts or is shaven, whereby the track width may shift. Also, such conventional PMRs have been hard to increase the quantity of magnetization in places near the ABS 503, which makes it difficult to yield a favorable overwrite characteristic (a characteristic by which data recorded on a recording medium is overwritten with another data).

Figure 20B:
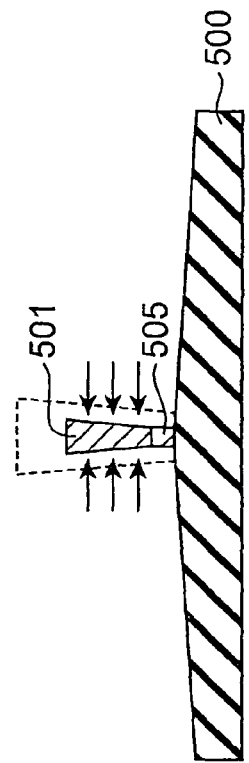
FIG. 20B shows a state after the photoresist is removed.
Figure 20A:
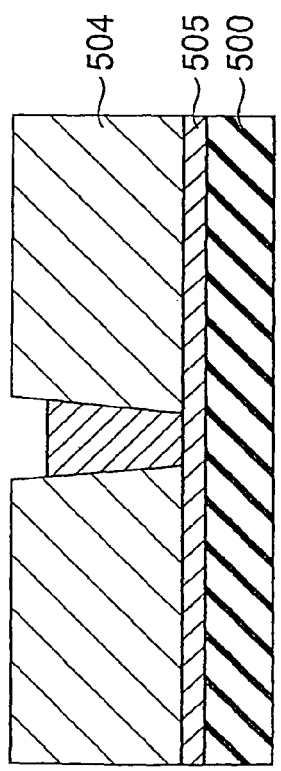
FIG. 20A shows a state provided with a photoresist.

The magnetic pole tip in the main magnetic pole layer 501 has conventionally been formed by plating using photolithography. In order for the ABS-side portion to have a bevel form, a resist pattern 504 having a taper angle as shown in FIG. 20A and a seed layer 505 interposed between the resist pattern 504 and the insulating layer 500 may be used. When the track width is to be narrowed in order to improve the recording density in this case, the ion beams P must be emitted after removing the resist pattern 504 as shown in FIG. 20B, so as to perform trimming with the IBE for a long time. As a result, the main magnetic pole layer including the magnetic pole tip having an even width cannot be obtained because of the problem of IBE etching speed mentioned above.

Figure 21B:
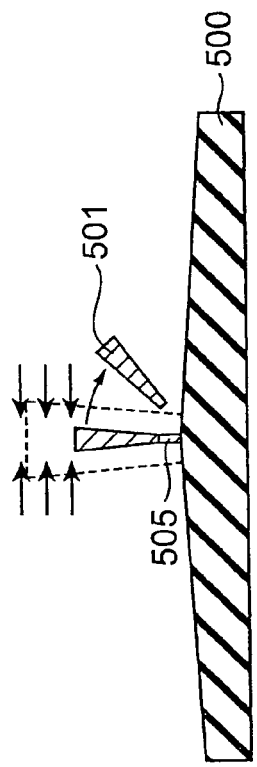
FIG. 21B shows a state after the photoresist is removed.
Figure 21A:
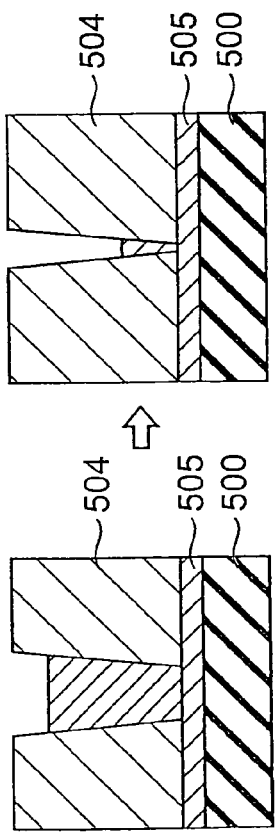
FIG. 21A shows a state provided with another photoresist.

When plating is performed with a resist pattern having a narrow width prepared beforehand as shown in FIG. 21A and FIG. 21B, on the other hand, the exposed surface of the seed layer 505 becomes narrower, whereby the seed layer 505 fails to supply electricity to the groove part defined by the resist pattern to such an extent that the main magnetic pole layer 501 grows sufficiently. Also, when the magnetic pole tip of the main magnetic pole layer 501 having a narrow width is subjected to the IBE, there is a fear of the formed magnetic pole tip falling down.

Thus, when the width of the magnetic pole tip is to be narrowed in order to improve the recording density in the conventional PMRs, the width must become uneven.

By contrast, the thin-film magnetic head structure 300 in this embodiment includes the insulating layer 1 provided with the cavity 2, in which the main magnetic pole layer 10 is embedded, and thus can eliminate all of the foregoing problems.

Namely, since the cavity 2 is sunken into a form corresponding to the outer form of the main magnetic pole layer 10, the main magnetic pole layer 10 can be formed in the shape and dimensions as set. Since the track width is determined by the very narrow groove part 3 of the cavity 2, there is no need to perform IBE for a long time at all in order for the magnetic pole tip to have a bevel form. Therefore, the neck height can be set to a value as assumed, the quantity of magnetism in places near the ABS 403 can be enhanced, and a thin-film magnetic head having a favorable overwrite characteristic can be manufactured.

The track width can be narrowed if the width of the very narrow groove part 3 is reduced as much as possible, whereas the very narrow groove part 3 can set the track width to a value assumed. Therefore, not only the track width is narrow, but also the dimensional accuracy and yield become favorable, and there is no fear of the formed magnetic pole tip falling down. Therefore, providing the cavity 2 as in the thin-film magnetic head structure 300 can reliably form the main magnetic pole layer having an enhanced recording density.

Figure 22A:
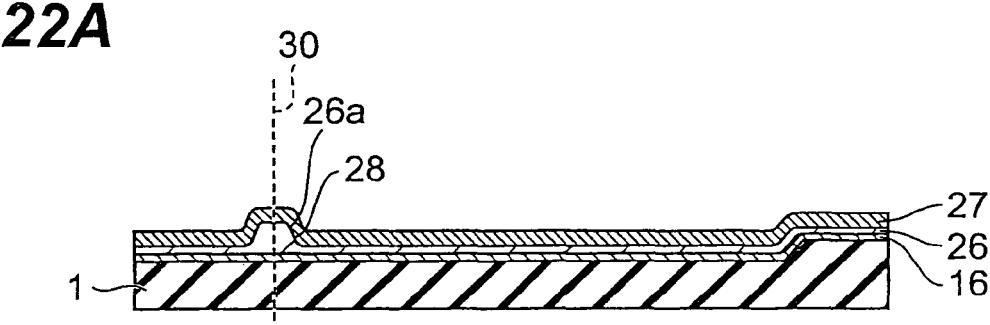
FIG. 22A, FIG. 22B, and FIG. 22C show first, second, and third steps, respectively.
Figure 22B:
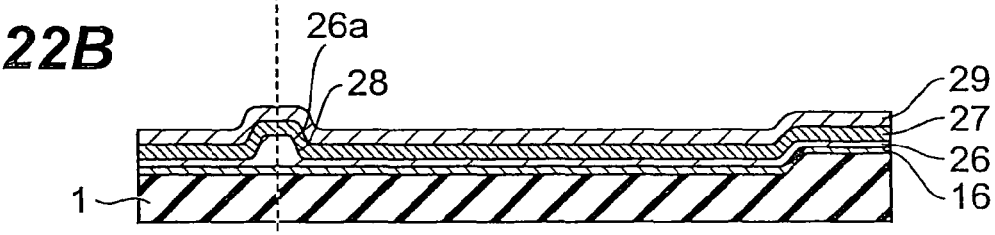

The main magnetic pole layer 10 in the thin-film magnetic head in accordance with the present invention can have a joint structure by the following manufacturing method. Namely, the supply of the magnetic material to become the magnetic layer 26 is terminated when the narrow groove 3 is completely filled with the magnetic layer 26 as shown in FIG. 22 (in the state shown in FIG. 16). Here, the magnetic layer 26 has an in-depression end face 26a exposed into a region other than the very narrow groove part 3 in the cavity 2, and thus is the end-face-equipped magnetic pole layer in the present invention. Then, a magnetic material having a saturated magnetic flux density (on the order of about 1.9 to 2.1 T) lower than that of the magnetic material constituting the magnetic layer 26 is started to be supplied. This yields a state where the magnetic layer 26 is formed on the surface of the inner side face of the cavity 2 and in the very narrow groove part 3, whereas the part other than the very narrow groove part 3 in the cavity 2 is filled with a magnetic layer 27 having a thickness of about 1.0 µm (see FIG. 22A).

In this case, the magnetic layer 27 joins with the in-depression end face 26a of the magnetic layer 26 within the cavity 2, whereby their joint becomes an interface 28. Namely, the magnetic layer 27 is the joining magnetic layer in the present invention, and will later form a yoke magnetic pole part 20A'. The interface 28 will later become an interface 14. Further, on the outer part of the insulating layer 1 in the whole surface of the substrate, an insulating layer 29 made of alumina ($Al_2O_3$) is formed by a thickness on the order of 0.5 µm to 1.0 µm (see FIG. 22B).

Figure 22C:
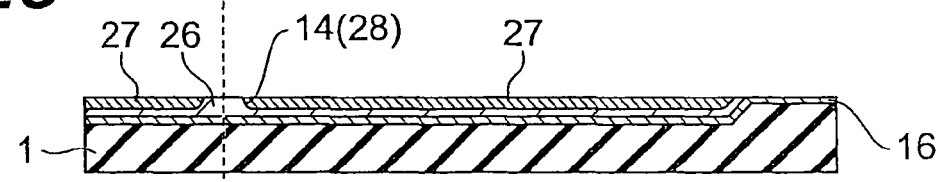

Subsequently, using the Ta layer 16b of the coating 16 as a stopper layer, the whole surface of the substrate including the surface of the magnetic layers 26 and 27 on the side closer to the thin-film coil 100 is subjected to CMP as a surface-flattening process (see FIG. 22C). This yields a main magnetic pole layer 10A' as shown in FIG. 23.

Figure 23A:
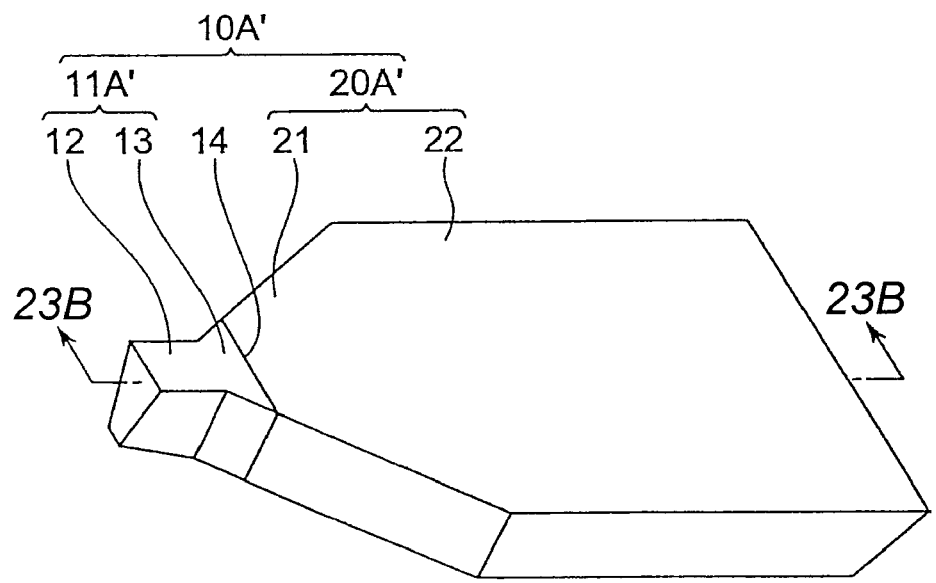
FIG. 23A is a perspective view.
Figure 23B:
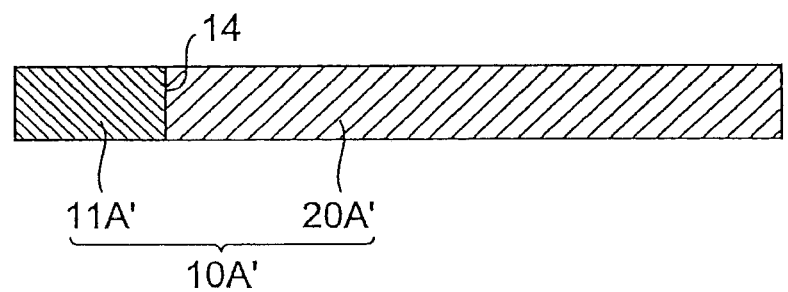
FIG. 23B is a sectional view taken along the line 23B of FIG. 23A.
Figure 24:
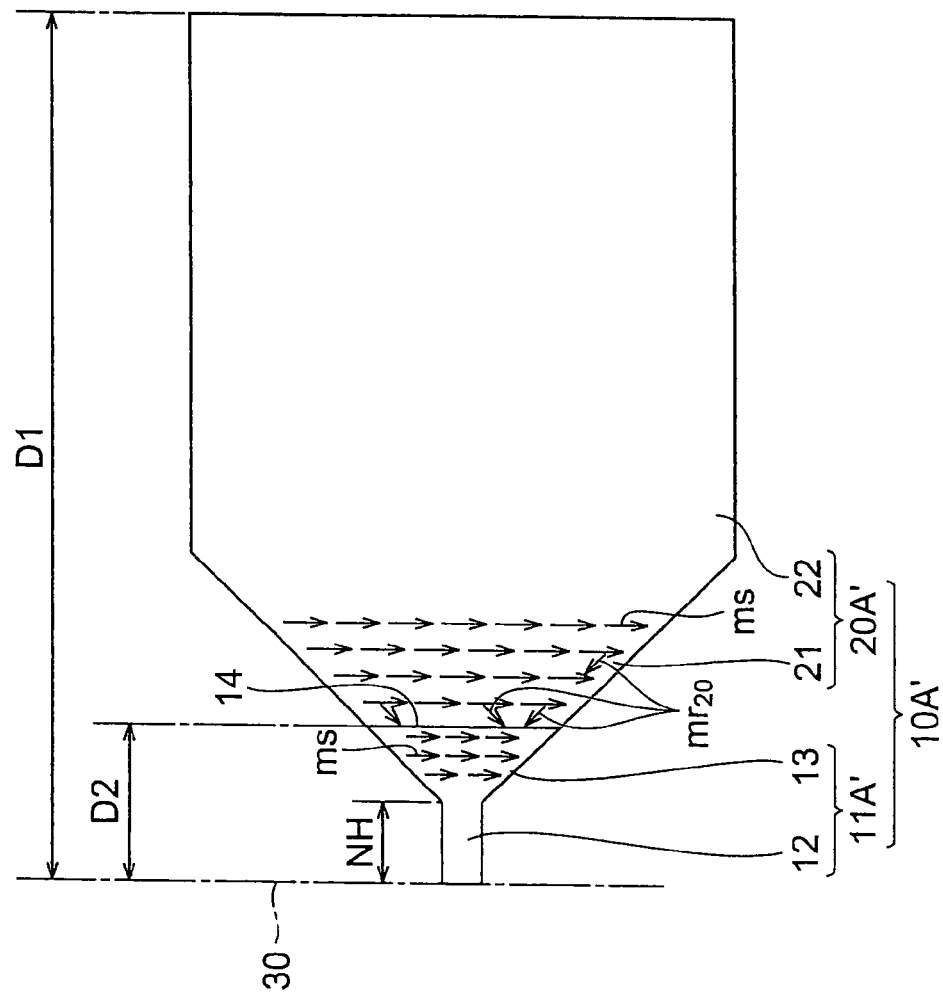
FIG. 24 is a plan view of the main magnetic pole layer shown in FIG. 23.

As shown in FIG. 23, the main magnetic pole layer 10A' comprises a magnetic pole tip 11A' and the yoke magnetic pole part 20A', whereas its surface on the side closer to the thin-film coil 100 has a stepless flat structure as in the main magnetic pole layer 10' shown in FIG. 4. FIG. 23 is a view showing the main magnetic pole layer 10A' after being cut along the ABS 30, in which FIG. 23A is a perspective view, and FIG. 23B is a sectional view taken along the line 23B of FIG. 23A. FIG. 24 is a plan view showing the main magnetic pole layer 10A'. The main magnetic pole layer 10A' has an end face joint structure in which respective end faces of the magnetic pole tip 11A' and yoke magnetic pole part 20A' extending along the ABS 30 are joined to each other in a region (variable width depression 4) other than the very narrow groove part 3 in the cavity 2. The joint between the end faces forms the interface 14.

The magnetic pole tip 11A' is disposed at a position closer to the ABS 30 than is the yoke magnetic pole part 20A'. The magnetic pole tip 11A' is constituted by a uniform width part 12 defining the track width of the thin-film magnetic head in the present invention, and a variable width part 13 having a variable width structure whose width extending along the ABS 30 gradually increases in the direction away from the ABS 30. The even width portion 12 extends in a direction intersecting the ABS 30 and has an even width of 0.1 µm in the extending direction of the magnetic pole tip 11'. The distance D2 from the ABS 30 to the rear end portion of the magnetic pole tip 11A' is shorter than the distance D1 from the ABS 30 to the rear end portion of the yoke magnetic pole part 20A', whereby the magnetic pole tip 11A' has a shortened structure so as not to connect with the write shield layer 40.

For enhancing the density at which data is recorded by the thin-film magnetic head, the magnetic head tip 11A' has a narrow track width structure in which the width W1 is reduced as in the magnetic pole tip 11'. The magnetic pole tip 11A' uses a magnetic material (Hi-Bs material) having a saturated magnetic flux density higher than that of the yoke magnetic pole part 20A' so as not to be saturated with magnetic fluxes even in the narrow track width structure. The magnetic pole tip 11A' and yoke magnetic pole part 20A' are magnetized such that the direction of magnetization ms aligns with the ABS 30 (see FIG. 24).

Known as an example of the conventional PMRs is a thin-film magnetic head 400 having a structure shown in FIGS. 25A, 25B and 25C. This thin-film magnetic head 400 includes a main magnetic pole layer 402 which is formed on an insulating layer 401 and has a bevel-shaped magnetic pole tip disposed on the side of an ABS 403; a write shield layer 405 which is magnetically connected to the main magnetic pole layer 402 and opposes the main magnetic pole layer 402 by way of a recording gap layer 404 on the ABS 403 side; and a thin-film coil 406. The thin-film coil 406 is wound in a planar spiral about a junction 408 connecting the main magnetic pole layer 402 and the write shield layer 405, while its windings are insulated from each other by a photoresist 407. In the conventional PMRs, as in the thin-film magnetic head 400, a magnetic material is magnetized such that the direction of magnetization ms is oriented so as to extend along the ABS 403, whereby the main magnetic pole layer 402 is formed.

In the conventional PMRs such as the thin-film magnetic head 400, however, even when the direction of magnetization ms is oriented so as to extend along the ABS 403, the direction of remnant magnetization mr inside the main magnetic pole layer 402 after completion of writing is oriented toward the ABS 403 side and thus faces a different direction than the magnetization ms. (The direction different from that extending along the ABS will be referred to as "different direction" in the following.) Therefore, when such a PMR writes data, leakage magnetic fluxes due to the remnant magnetization mr may erase data already written on a hard disk or weaken signals of written data even though no write current is flowing.

Namely, since the main magnetic layer 402 is formed from the same magnetic material from the ABS 403 to the end part on the opposite side by way of the thin-film coil, the remnant magnetization is directed to the ABS 403 in the conventional PMRs. In the thin-film magnetic head structure 300 comprising the main magnetic pole layer 10A having the end face joint structure constituted by two magnetic poles, i.e., the magnetic pole tip 11A and yoke magnetic pole part 20A, by contrast, the interface 14 formed by the end face junction between the magnetic pole tip 11A and yoke magnetic pole part 20A blocks the emission of remnant magnetization $mr_{20}$ from the yoke magnetic pole part 20A to the magnetic pole tip 11A. As a consequence, the thin-film magnetic head structure 300 can make a thin-film magnetic head with reduced remnant magnetization mr directed to the ABS 30. Even when the material constituting the main magnetic pole layer 10A and the material constituting the yoke magnetic pole part 20A are the same, the end face joint structure can be formed, whereby the pole erasure can be prevented from occurring.

Since the magnetic pole tip 11A is made smaller than the yoke magnetic pole part 20A, such that the yoke magnetic pole part 20A has a size (area) greater than that of the magnetic pole tip 11A, the quantity of magnetization (also known as magnetic volume) of the yoke magnetic pole part 20A is greater than that of the magnetic pole tip 11A. However, the interface 14 blocks the emission of remnant magnetization from the yoke magnetic pole part 20A having a greater quantity of magnetization, so that the emission of remnant magnetization decreases drastically, whereby the pole erasure is more effectively prevented from occurring.

Further, as explained with reference to FIG. 14, the direction of crystallization of the magnetic crystals 26b in the magnetic body growing on the inner side face of the very narrow groove part 3 is oriented in a direction traversing the very narrow groove part 3. Namely, the direction of crystallization and the direction of magnetic field (i.e., the extending direction of the very narrow groove part 3) in the even width portion 12 formed within the very narrow groove part 3 are orthogonal to each other. The inventors have newly found that the occurrence of the pole erasure can be suppressed more effectively when the direction of crystal growth of the magnetic crystals 26b and the direction of magnetic field within the even width portion 12 in the main magnetic pole layer 10 have such a relationship therebetween.

Meanwhile, in the case of a conventional PMR, the main magnetic pole layer is preferably a magnetic material with a small maximum coercivity Hc (about 2-10 Oe) and a small magnetostriction λ ($1-3\times10^{-6}$), while it is also preferably a magnetic material with a small magnetostriction λ in order to eliminate the aforementioned pole erasure.

However, in order to avoid impairment in the overwrite characteristic which occurs with flux saturation even if the track width is narrowed to improve the recording density, the magnetic material of the main magnetic pole layer is preferably formed of a magnetic material with a high saturated flux density, but when this is done it becomes difficult to lower the magnetostriction λ of the main magnetic pole layer. In view of this point, the above-mentioned thin-film magnetic head structure 300 forms the main magnetic pole layer 10A as a joint structure made of the magnetic pole tip 11A and yoke magnetic pole part 20A having respective saturated magnetic flux densities different from each other, while the saturated magnetic flux density of the yoke magnetic pole part 20A is made lower than that of the magnetic pole tip 11A, so as to reduce the magnetostriction λ of the yoke magnetic pole part 20A. This makes the main magnetic pole layer 10A reduce the magnetostriction λ as a whole. Hence, using the thin-film magnetic head structure 300 yields a thin-film magnetic head which can more effectively prevent the pole erasure from occurring.

MODIFIED EXAMPLES

Without being restricted to the above-mentioned embodiment, the present invention can be modified in various manners.

Modified Example 1

The above-mentioned manufacturing process of the thin-film magnetic head structure can be modified as follows. Namely, after the whole upper face of the substrate is subjected to CMP as explained with reference to FIGS. 12A and 12B, the thin-film coil 100 is formed by way of the insulating layer 31 earlier than the second shield part 42. Subsequently, the photoresist 101 is formed so as to cover the thin-film coil 100. Further, the second shield part 42 is formed so as to cover the thin-film coil 100 and the photoresist 101, and connect with the first shield part 41 and the back magnetic pole layer 51. This yields a thin-film magnetic head structure 301 including the write shield layer 40 comprising the first shield part 41 and second shield part 42 without the third shield part 43 as shown in FIGS. 26A and 26B.

This thin-film magnetic head structure 301 has the same configuration as with the thin-film magnetic head structure 300 except that it lacks the third shield part 43 and the insulating layer 32. Therefore, the thin-film magnetic head structure 301 exhibits the same operations and effects as with the thin-film magnetic head structure 300. The manufacturing process in this modified example requires no step for manufacturing the third shield part 43, and thus can become simpler than the manufacturing process of the thin-film magnetic head structure 300.

Modified Example 2

A nonmagnetic film 61 may be interposed between the magnetic pole tip 11A and yoke magnetic pole layer 20A forming the above-mentioned end face junction as in a thin-film magnetic head structure 310 shown in FIG. 27. The nonmagnetic film 61 is formed in a portion of the yoke magnetic pole part 20 other than its surface on the thin-film coil 100 side. Namely, the nonmagnetic film 61 is disposed at the interface 14 between the magnetic pole tip 11 and the yoke magnetic pole part 20, and in the portion between the yoke magnetic pole part 20 and the coating 16. The nonmagnetic film 61 is made of Ru, Ta, W, Cr, NiPd, or the like and has a thickness of about 10 to 30 Å.

The nonmagnetic film 61 functions to control the direction of remnant magnetization mr in the magnetic pole tip 11 and yoke magnetic pole part 20 and prevent the direction of remnant magnetization mr from being oriented in a different direction. Therefore, the thin-film magnetic head structure 310 can more effectively prevent the pole erasure from occurring, while improving the recording density more than the thin-film magnetic head structure 300 does.

Modified Example 3

An upper yoke magnetic pole part 45 may be provided as appropriate as in a thin-film magnetic head structure 320 shown in FIG. 28. The thin-film magnetic head structure 320 includes the upper yoke magnetic pole part 45, which is joined to the surface of the yoke magnetic pole part 20 on the side closer to the thin-film coil 100 at a position distant from the ABS 30 than is the recording gap layer 24. The upper yoke magnetic pole part 45 is formed together with the first shield part 41 when the first shield part 41 is formed by plating.

Joining the upper yoke magnetic pole part 45 to the yoke magnetic pole part 20 can increase the quantity of magnetization of the main magnetic pole layer 10 in the vicinity of the ABS 30. Therefore, the thin-film magnetic head structure 320 can manufacture a thin-film magnetic head having a favorable overwrite characteristic. When manufacturing the thin-film magnetic head structure 320, it will be sufficient if the step of joining the upper yoke magnetic pole part 45 to a part distant from the ABS 30 than is the recording gap layer 24 in the yoke magnetic pole part 20 is further provided.

Modified Example 4

Similarly, a lower yoke magnetic pole part 46 may be provided as appropriate as in a thin-film magnetic head structure 330 shown in FIG. 29. The thin-film magnetic head structure 330 includes the lower yoke magnetic pole part 46, which is joined to the surface of the yoke magnetic pole layer 20A at a position opposing the thin-film coil 100 by way of the yoke magnetic pole part 20. The lower yoke magnetic pole part 46 is formed in the stage of forming the cavity 2 by using a known photolithography technique.

Joining the lower yoke magnetic pole part 46 to the yoke magnetic pole part 20 can increase the quantity of magnetization of the main magnetic pole 10 in the vicinity of the ABS 30 as with the above-mentioned upper yoke magnetic pole layer 45. Therefore, the thin-film magnetic head structure 330 can manufacture a thin-film magnetic head having a favorable overwrite characteristic.

Modified Example 5

The form of the cavity 2 provided in the above-mentioned thin-film magnetic head structures 300, 301, 310, 320, 330 is not limited to the form shown in FIG. 2, but may be changed to those shown in FIGS. 30 to 35 and the like as appropriate.

Figure 30:
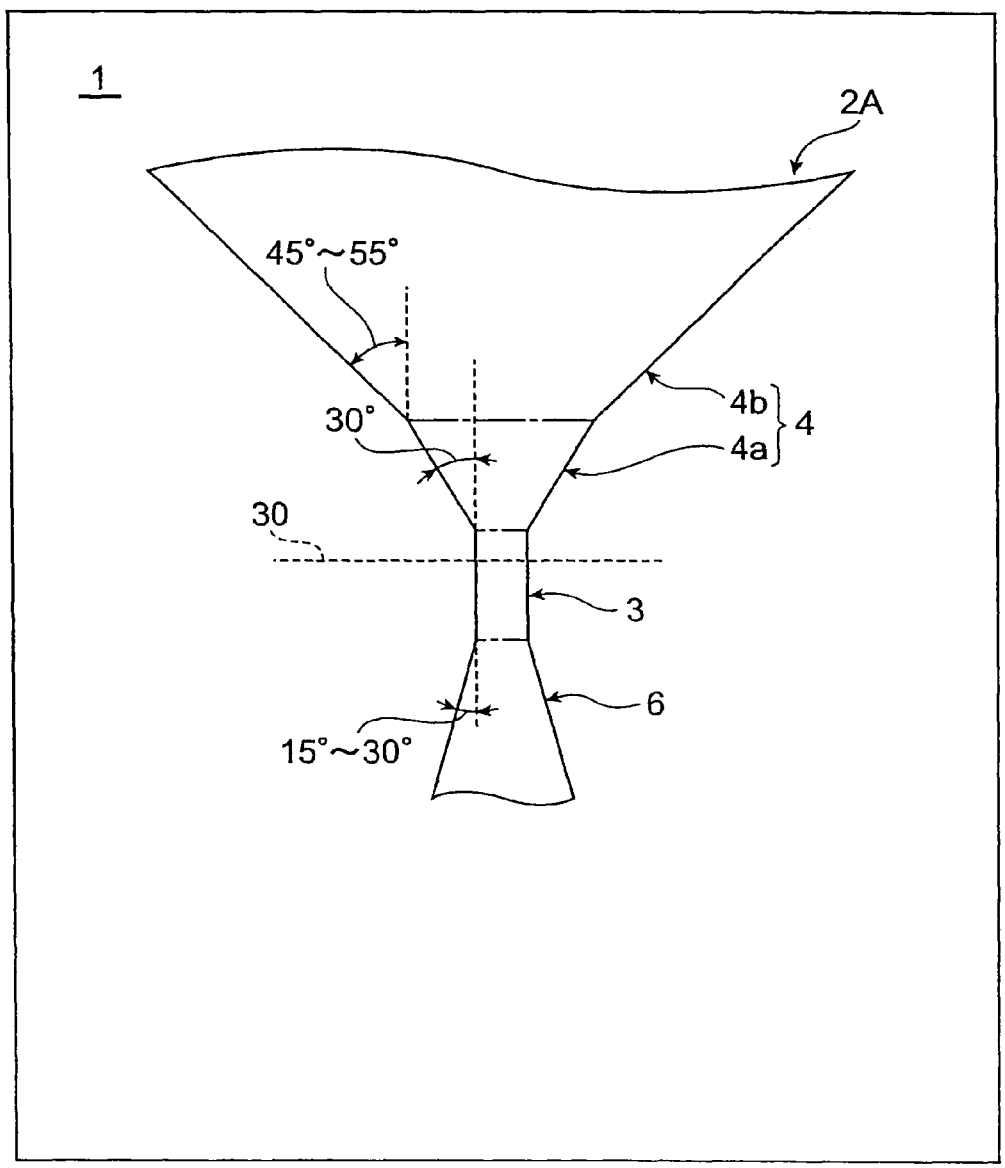
FIG. 30 is a view showing a mode of cavity.
Figure 31:
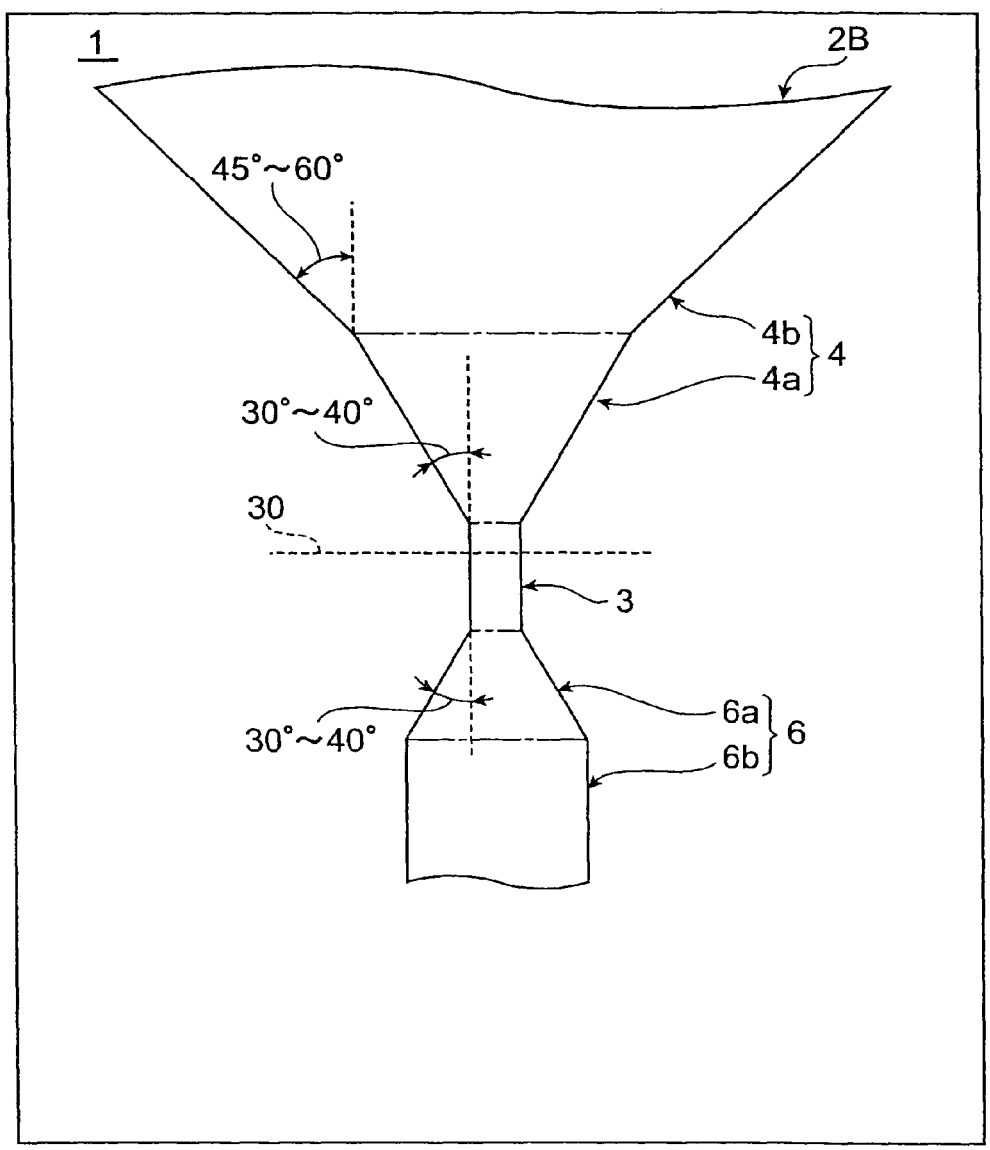
FIG. 31 is a view showing a mode of cavity.
Figure 32:
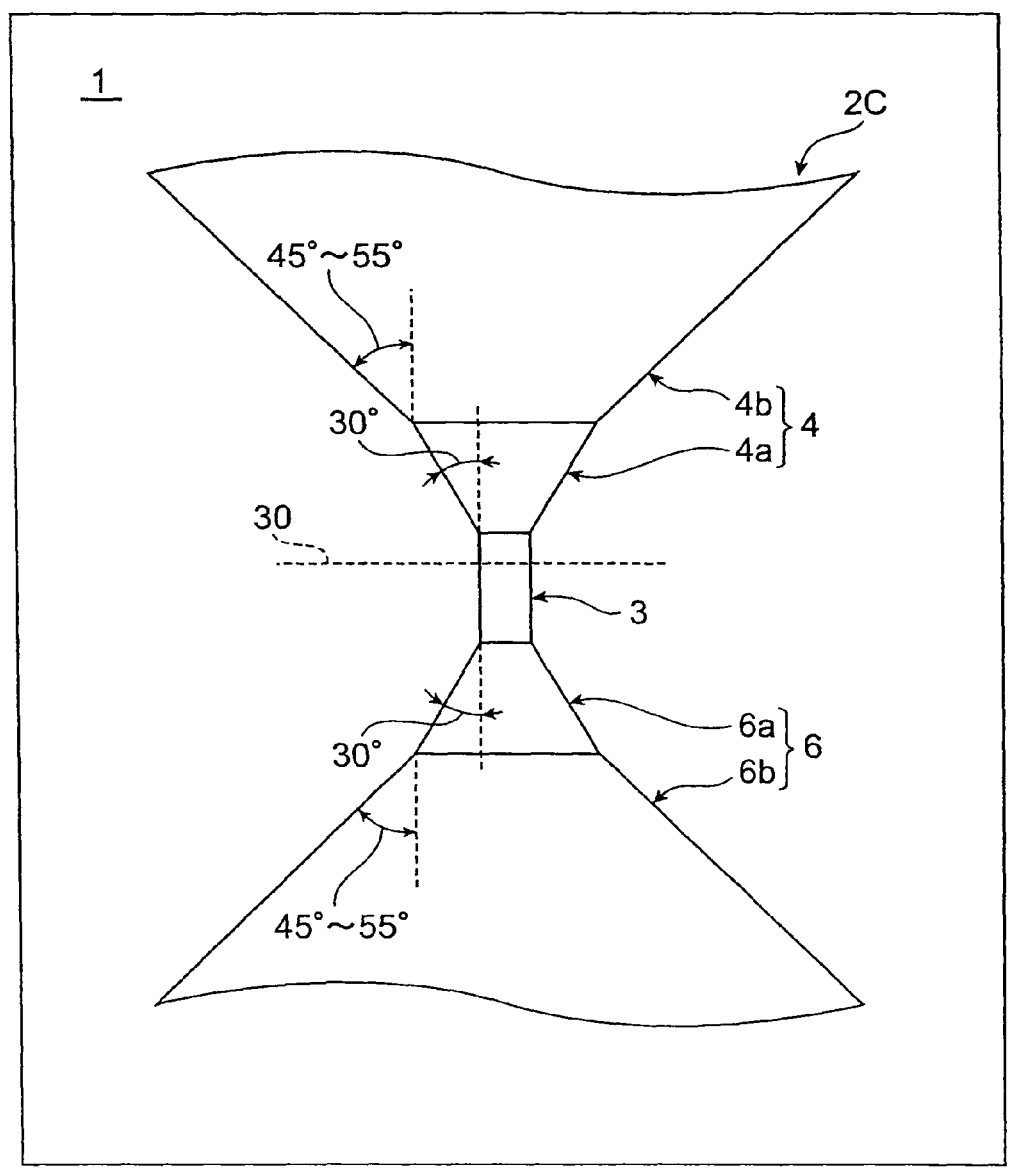
FIG. 32 is a view showing a mode of cavity.
Figure 33:
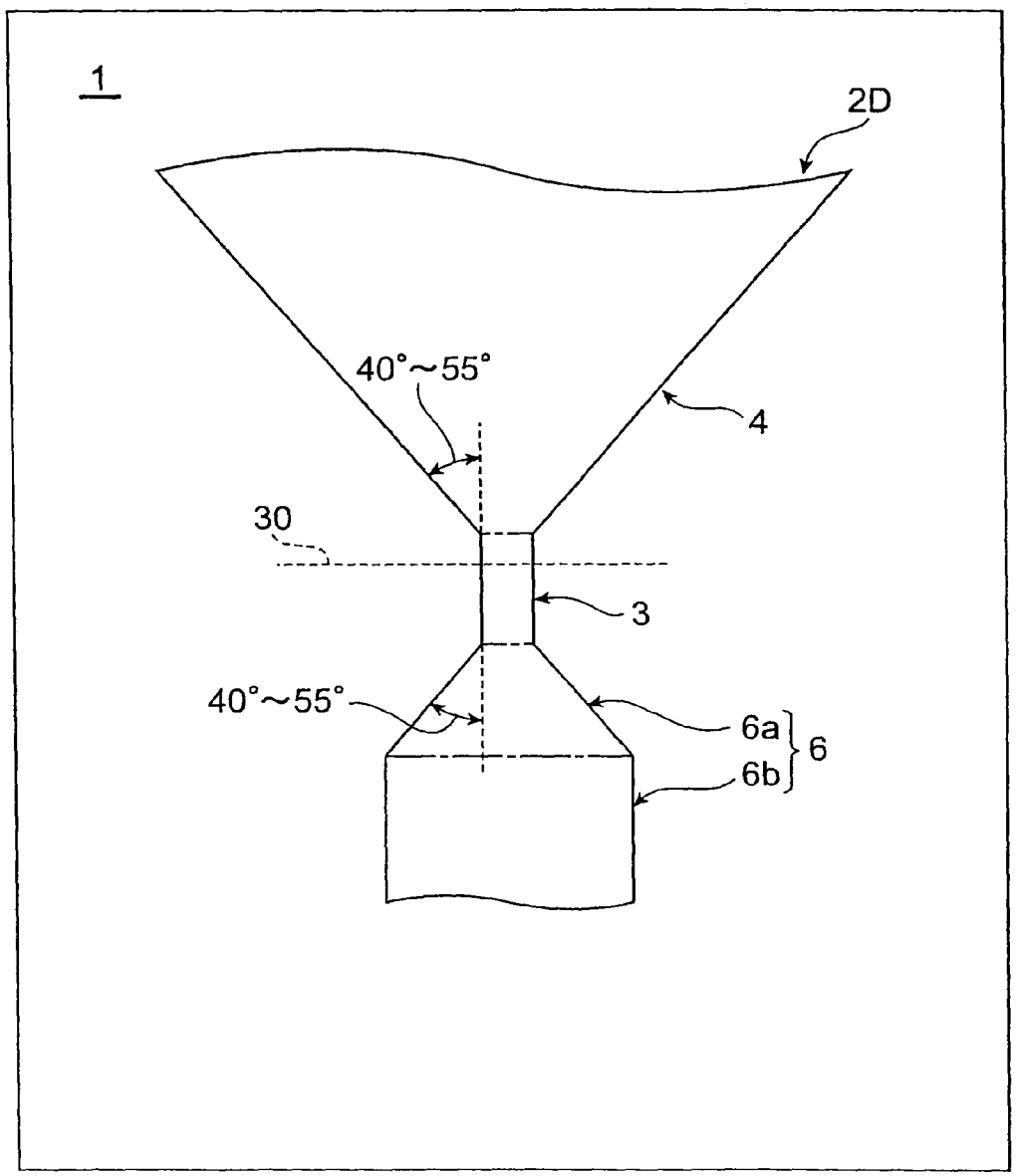
FIG. 33 is a view showing a mode of cavity.

The cavity 2A shown in FIG. 30 differs from the cavity 2 shown in FIG. 2 in that the variable width depression 4 is constituted by two stages of variable width depressions 4a, 4b having respective flare angles different from each other. The cavity 2B shown in FIG. 31 differs from the cavity 2 shown in FIG. 2 in that the variable width depression 4 is constituted by two stages of variable width depressions 4a, 4b having respective flare angles different from each other, and that the protruded depression 6 is constituted by a variable width depression 6a and a fixed width depression 6b. The cavity 2C shown in FIG. 32 differs from the cavity 2 shown in FIG. 2 in that the variable width depression 4 is constituted by two stages of variable width depressions 4a, 4b having respective flare angles different from each other, and that the protruded depression 6 is constituted by two stages of variable width depressions 6a, 6b having respective flare angles different from each other. The cavity 2D shown in FIG. 33 differs from the cavity 2 shown in FIG. 2 in that the protruded depression 6 is constituted by a variable width depression 6a and a fixed width depression 6b.

Figure 34:
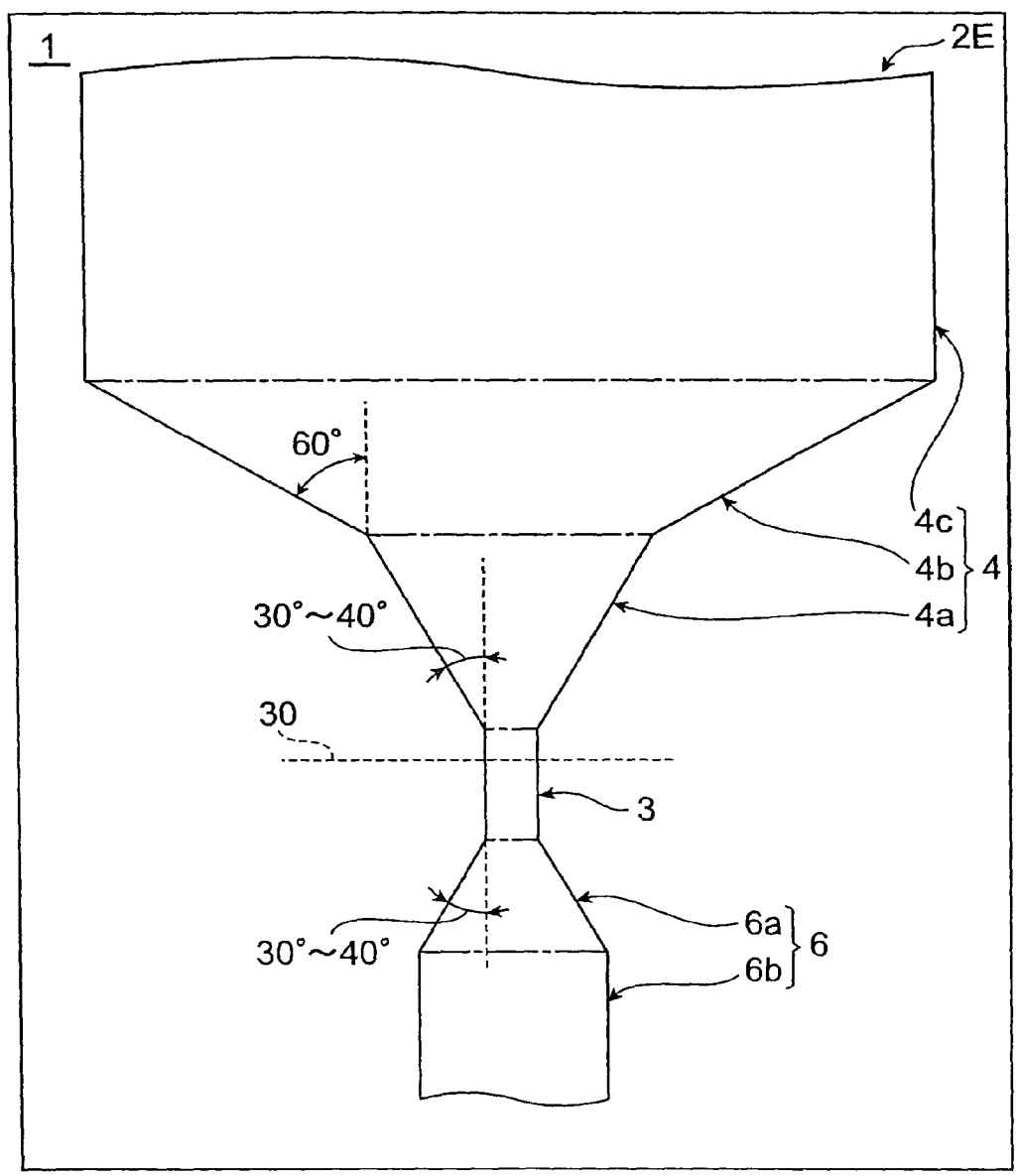
FIG. 34 is a view showing a mode of cavity.
Figure 35:
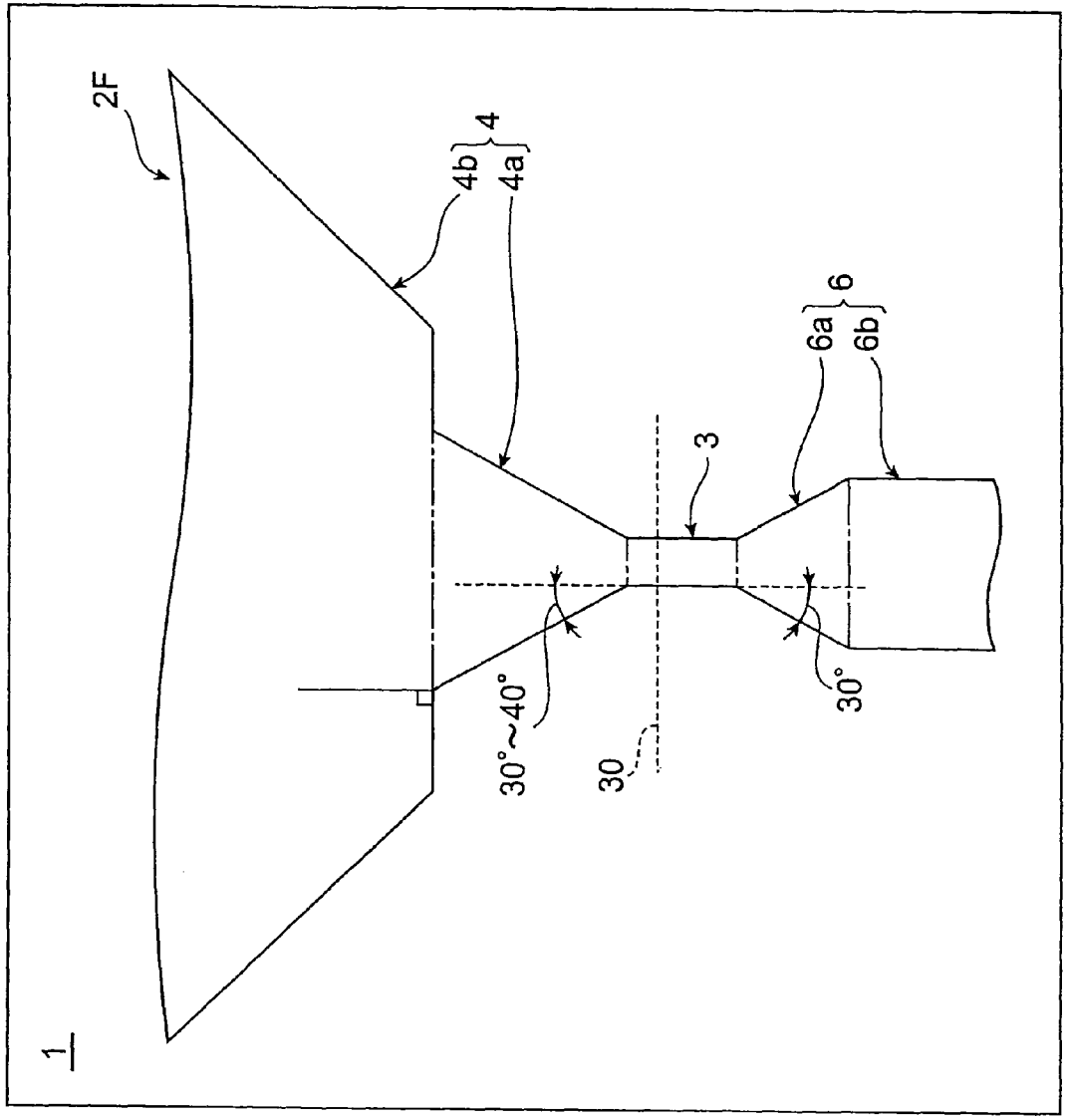
FIG. 35 is a view showing a mode of cavity.

In the cavity 2E shown in FIG. 34, the depression corresponding to the yoke magnetic pole layer 20 is constituted by two stages of variable width depressions 4a, 4b having respective flare angles different from each other, and a fixed width depression 4c. In the cavity 2F shown in FIG. 35, the depression corresponding to the yoke magnetic pole layer 20 is constituted by two stages of variable width depressions 4a, 4b having respective flare angles different from each other with respective widths different from each other at their boundary position. Namely, at the boundary position between the variable width depressions 4a and 4b, the width of the variable width depression 4b is greater than that of the variable width depression 4a. Though FIGS. 30 to 35 exemplify flare angles, these angles are not restrictive.

It is not always necessary for the above-mentioned thin-film magnetic head structures 300, 301, 310, 320, 330 to be manufactured with the cavity 2, and their manufacturing method can be changed to known photolithography techniques as appropriate. The end face of the magnetic pole tip does not necessarily have a bevel form, but may have any known end face form. The width of the even width portion in the magnetic pole tip is not limited to 0.1 μm, but may appropriately be increased or decreased as long as it is not greater than 0.2 μm.

It is apparent that various embodiments and modifications of the present invention can be embodied, based on the above description. Accordingly, it is possible to carry out the present invention in the other modes than the above best mode, within the following scope of claims and the scope of equivalents.

What is claimed is:

1. A structure adapted to manufacture a thin-film magnetic head, the thin film magnetic head being configured such that a main magnetic pole layer including a magnetic pole tip on a side of a medium-opposing surface opposing a recording medium, a write shield layer opposing the magnetic pole tip so as to form a recording gap layer on the medium-opposing surface side, and a thin-film coil wound about the write shield layer or the main magnetic pole layer are laminated, the structure comprising:

a base insulating layer including a magnetic pole forming depression recessed to correspond to an entirety of the main magnetic pole layer including a side surface and a rear surface of the main magnetic pole layer, the magnetic pole forming depression being structured to receive an entirety of both the side surface and the rear surface of the main magnetic pole layer and including a very narrow groove part having a substantially even width, the even width portion being formed in the very narrow groove part of the magnetic pole forming depression, wherein the magnetic pole tip of the main magnetic pole layer includes an even width portion having a substantially even width along an extending direction intersecting the medium-opposing surface, the thin film coil is disposed outside of the magnetic pole forming depression of the base insulating layer, the magnetic pole forming depression includes a pair of variable width depressions continuously extending from respective end parts of the very narrow groove part, each of the variable width depressions having a width increasing in a direction away from the very narrow groove part, and the very narrow groove part has a width and a length structured to receive a plated material grown in the variable width depression without forming a gap when forming the main magnetic pole layer by plating within the magnetic pole forming depression.

2. A structure according to claim 1, wherein the main magnetic pole layer has an end face joint structure where respective end faces of the magnetic pole tip and a yoke magnetic pole part having a size greater than a size of the magnetic pole tip are joined to each other.

3. A structure according to claim 1, wherein the very narrow groove part is formed such that a groove width intersecting the length of the very narrow groove part gradually decreases along the depth of the very narrow groove part.

4. A structure according to claim 1, wherein the magnetic pole forming depression is formed by reactive ion etching (RIE).

5. The structure of claim 1, wherein an outer surface of the main magnetic pole layer is substantially parallel to the base insulating layer such that the outer surface of the main magnetic pole layer is flat.

6. The structure of claim 1, wherein a thickness of the magnetic pole tip is substantially equal to a thickness of a yoke magnetic pole part.

7. The structure of claim 1, wherein the thin-film coil is formed on an outer surface of the main magnetic pole layer.

8. A structure adapted to manufacture a thin-film magnetic head, the thin film magnetic head being configured such that a main magnetic pole layer including a magnetic pole tip on a side of a medium-opposing surface opposing a recording medium, a write shield layer opposing the magnetic pole tip so as to form a recording gap layer on the medium-opposing surface side, and a thin-film coil wound about the write shield layer or the main magnetic pole layer are laminated, the structure comprising:

a base insulating layer including a magnetic pole forming depression recessed to correspond to an entirety of the main magnetic pole layer including a side surface and a rear surface of the main magnetic pole layer, the magnetic pole forming depression being structured to receive an entirety of both the side surface and the rear surface of the main magnetic pole layer and including a very narrow groove part having a substantially even width, the even width portion being formed in the very narrow groove part of the magnetic pole forming depression, wherein the magnetic pole tip of the main magnetic pole layer includes an even width portion having a substantially even width along an extending direction intersecting the medium-opposing surface, the thin film coil is disposed outside of the magnetic pole forming depression of the base insulating layer, the magnetic pole forming depression includes a pair of variable width depressions continuously extending from respective end parts of the very narrow groove part, each of the variable width depressions having a width increasing in a direction away from the very narrow groove part, the very narrow groove part has a width and a length structured to receive a plated material grown in the variable width depression without forming a gap when forming the main magnetic pole layer by plating within the magnetic pole forming depression, and the even width portion has a length of 0.3 μm to 1.2 μm along an extending direction thereof.

9. A structure adapted to manufacture a thin-film magnetic head, the thin film magnetic head being configured such that a main magnetic pole layer including a magnetic pole tip on a side of a medium-opposing surface opposing a recording medium, a write shield layer opposing the magnetic pole tip so as to form a recording gap layer on the medium-opposing surface side, and a thin-film coil wound about the write shield layer or the main magnetic pole layer are laminated, the structure comprising:

a base insulating layer including a magnetic pole forming depression recessed to correspond to an entirety of the main magnetic pole layer including a side surface and a rear surface of the main magnetic pole layer, the magnetic pole forming depression being structured to receive an entirety of both the side surface and the rear surface of the main magnetic pole layer and including a very narrow groove part having a substantially even width, the even width portion being formed in the very narrow groove part of the magnetic pole forming depression, wherein the magnetic pole tip of the main magnetic pole layer includes an even width portion having a substantially even width along an extending direction intersecting the medium-opposing surface, the thin film coil is disposed outside of the magnetic pole forming depression of the base insulating layer, the magnetic pole forming depression includes a pair of variable width depressions continuously extending from respective end parts of the very narrow groove part, each of the variable width depressions having a width increasing in a direction away from the very narrow groove part, the very narrow groove part has a width and a length structured to receive a plated material grown in the variable width depression without forming a gap when forming the main magnetic pole layer by plating within the magnetic pole forming depression, and the even width portion has a width of 0.2 μm or less.

* * * * *